US011694287B2

(12) United States Patent
Marcinkowski et al.

(10) Patent No.: US 11,694,287 B2
(45) Date of Patent: Jul. 4, 2023

(54) INTELLIGENT PROPERTY MANAGEMENT SYSTEM

(71) Applicant: EDST, LLC, Lubbock, TX (US)

(72) Inventors: Dave Marcinkowski, Lubbock, TX (US); Thomas Mandry, Lubbock, TX (US)

(73) Assignee: EDST, LLC, Lubbock, TX (US)

( * ) Notice: Subject to any disclaimer, the term of this patent is extended or adjusted under 35 U.S.C. 154(b) by 553 days.

(21) Appl. No.: 15/984,249

(22) Filed: May 18, 2018

(65) Prior Publication Data
US 2019/0355076 A1 Nov. 21, 2019

(51) Int. Cl.
*G06Q 50/16* (2012.01)
*H04W 4/021* (2018.01)
(Continued)

(52) U.S. Cl.
CPC ........... *G06Q 50/163* (2013.01); *G06Q 20/00* (2013.01); *G06Q 30/0278* (2013.01); *G06Q 40/02* (2013.01); *G06Q 40/06* (2013.01); *H04L 9/0637* (2013.01); *H04W 4/021* (2013.01); *H04W 4/38* (2018.02); *H04L 9/50* (2022.05)

(58) Field of Classification Search
CPC ...... G06Q 50/163; G06Q 20/00; G06Q 40/06; G06Q 40/02; G06Q 30/0278; H04W 4/021; H04W 4/38; H04L 9/0637; H04L 2209/38; H04L 2209/80
See application file for complete search history.

(56) References Cited

U.S. PATENT DOCUMENTS 7,143,048 B1 * 11/2006 Ruben ................... G06Q 10/02
705/313
8,271,321 B1 * 9/2012 Kestenbaum .......... G06Q 10/10
705/14.1
(Continued)

FOREIGN PATENT DOCUMENTS

CA 3048139 A1 * 6/2018 ............. G06T 11/60
CN 204496183 U * 7/2015
(Continued)

OTHER PUBLICATIONS

Dylan Yaga et al "Blockchain Technology Overview", National Institute of Standards and Technology, NISTIR 8202, Oct. 2018, entire document, https://doi.org/10.6028/NIST.IR.8202 (Year: 2018).*
(Continued)

*Primary Examiner* — Gerardo Araque, Jr.
(74) *Attorney, Agent, or Firm* — Norton Rose Fulbright US LLP

(57) ABSTRACT

An intelligent property management system comprises an intelligent property management platform. The intelligent property management platform communicates with other system components via respective communication portals. The respective portals comprise a vendor portal, a tenant portal, an investor portal, a security device portal, and a communications service portal. These features enable the intelligent property management system, while utilizing a communication network, to intelligently improve, e.g., maintenance, security, communication, vendors services, and investments relating to managed properties.

21 Claims, 16 Drawing Sheets

(51) Int. Cl.
*H04W 4/38* (2018.01)
*G06Q 40/06* (2012.01)
*G06Q 40/02* (2023.01)
*H04L 9/06* (2006.01)
*G06Q 30/02* (2023.01)
*G06Q 20/00* (2012.01)
*H04L 9/00* (2022.01)

(56) References Cited

U.S. PATENT DOCUMENTS

| | | | | |
|---|---|---|---|---|
| 10,638,292 | B2* | 4/2020 | Karp | H04W 4/60 |
| 10,855,957 | B2* | 12/2020 | Kapoustin | H04N 5/23206 |
| 11,044,579 | B2* | 6/2021 | Chang | H04W 4/02 |
| 2004/0098279 | A1* | 5/2004 | Frazier | G06Q 10/10 |
| | | | | 705/302 |
| 2005/0049937 | A1* | 3/2005 | Sanders | G06Q 30/0623 |
| | | | | 705/26.4 |
| 2005/0144028 | A1* | 6/2005 | Donahue | G06Q 50/163 |
| | | | | 705/314 |
| 2008/0094230 | A1* | 4/2008 | Mock | G08B 21/22 |
| | | | | 340/539.13 |
| 2011/0276452 | A1* | 11/2011 | Stephens | G06Q 10/087 |
| | | | | 705/35 |
| 2013/0013522 | A1* | 1/2013 | Thielges | G06Q 10/06 |
| | | | | 705/314 |
| 2014/0032433 | A1* | 1/2014 | Eick | G06Q 50/163 |
| | | | | 705/314 |
| 2015/0111524 | A1* | 4/2015 | South | G08B 25/016 |
| | | | | 455/404.2 |
| 2015/0227992 | A1* | 8/2015 | Wong | G06Q 30/0283 |
| | | | | 702/187 |
| 2016/0196731 | A1* | 7/2016 | Aich | G08B 25/08 |
| | | | | 340/539.17 |
| 2017/0048476 | A1* | 2/2017 | Freiin von Kapri | |
| | | | | H04L 12/2829 |
| 2017/0214801 | A1* | 7/2017 | Gaspard | H04L 51/52 |
| 2018/0001184 | A1 | 1/2018 | Tran et al. | |
| 2018/0060981 | A1 | 3/2018 | Sher | |
| 2018/0068403 | A1 | 3/2018 | Vaughn et al. | |
| 2018/0188704 | A1* | 7/2018 | Cella | G05B 19/0423 |
| 2018/0240055 | A1* | 8/2018 | Theus | G06Q 10/06311 |
| 2018/0322597 | A1* | 11/2018 | Sher | H04L 67/22 |
| 2018/0322598 | A1* | 11/2018 | Collins | G06Q 30/04 |
| 2018/0376313 | A1* | 12/2018 | Horton | H04L 12/2816 |
| 2019/0018850 | A1* | 1/2019 | Bartz | G06F 3/0488 |
| 2019/0057466 | A1* | 2/2019 | Udell | G06Q 10/20 |

FOREIGN PATENT DOCUMENTS

| | | | | |
|---|---|---|---|---|
| CN | 108460578 A | * | 8/2018 | |
| JP | 4154050 B2 | * | 9/2008 | |
| KR | 20140119987 A | * | 10/2014 | |
| KR | 20210152714 A | * | 12/2021 | |
| WO | WO-2016034297 A1 | * | 3/2016 | A61G 7/1065 |
| WO | WO-2017100686 A1 | * | 6/2017 | H04W 4/029 |
| WO | WO-2017189451 A1 | * | 11/2017 | G01S 1/68 |
| WO | WO-2018169549 A1 | * | 9/2018 | G06F 21/31 |

OTHER PUBLICATIONS

The Alpine Group "Portland Property Management and Property Managers," https://web.archive.org/web/20170505134707/https://www.alpinepdx.com/ May 5, 2017 (Year: 2017).*

Boundless Management "Home Page—Boundless Management." https://web.archive.org/web/20170515222352/https://boundlessmanagement.com/ May 15, 2017 (Year: 2017).*

Anonymous "Honeywell to Introduce DIY Security System," SDM, vol. 47, (12), pp. 18, Dec. 2017. (Year: 2017).*

K. Chapman and D. McCartney, "Smart homes for people with restricted mobility," Property Management, vol. 20, (2), pp. 153, 2002 (Year: 2002).*

Weili Lin "Multi-functional sensors search for new applications and value" Oct. 6, 2015, https://www.asmag.com/showpost/26404.aspx (Year: 2015).*

Byron Spice "Internet of Things Made Simple: One Sensor Package Does Work of Many" May 11, 2017, https://www.cmu.edu/news/stories/archives/2017/may/internet-of-things-sensors.html (Year: 2017).*

Staff Writer "8 sensors to help you create a smart home" Dec. 15, 2016, https://www.ibm.com/blogs/internet-of-things/sensors-smart-home/ (Year: 2016).*

International Search Report and Written Opinion issued for PCT Application No. PCT/IB2019/053601, dated Oct. 28, 2019, 12 pages.

* cited by examiner

INTELLIGENT PROPERTY MANAGEMENT SYSTEM

INCORPORATION BY REFERENCE

The present application is related to co-pending U.S. patent application Ser. No. 15/881,641, entitled Modular Intelligent Door and Frame, filed Jan. 26, 2018, the disclosure of which is hereby incorporated herein by reference.

TECHNICAL FIELD

The present disclosure is directed to an intelligent property management system. In particular, the present disclosure is directed to an intelligent property management system that utilizes a communication network comprising a management platform in communication with other nodes via various portals to intelligently improve maintenance, security, communication, vendors services, and investments relating to managed properties.

BACKGROUND

A management office for properties (e.g., apartments, offices, storage units, and the like) has traditionally served as a point of contact for people conducting business with such properties. For example, tenants can communicate with office managers via email, text messages, and other means to conduct business, pay required fees, and request services. Likewise, vendors can communicate with office managers in similar ways to fulfill service requests, negotiate services scheduling, submit invoices, and procure payments. Property management can in also comprise ensuring basic services like, e.g., security and communications, as well as managing and communicating with property investors.

Property management systems have relied on various incongruent technologies to communicate entities involved in the property management ecosystem. The various technologies comprise emails, text messages, voicemails, instant messengers, facsimiles, written agreements, and the like utilized to track and maintain documents that have legal implications. Use of these incongruent systems create several inefficiencies. The foregoing problems are exacerbated as the means of mobile communication continues to evolve.

SUMMARY OF THE DISCLOSURE

Embodiments described herein provide an intelligent property management system comprising an intelligent property management platform. The intelligent property management platform communicates with other system components via respective communication portals. The respective portals comprise a vendor portal, a tenant portal, an investor portal, a security device portal, and a communications service portal. These features enable the intelligent property management system, while utilizing a communication network, to intelligently improve, e.g., maintenance, security, communication, vendors services, and investments relating to managed properties.

The foregoing has outlined rather broadly the features and technical advantages of the present invention in order that the detailed description of the invention that follows can be better understood. Additional features and advantages of the invention will be described hereinafter which form the subject of the claims of the invention. It should be appreciated by those skilled in the art that the conception and specific embodiment disclosed can be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE FIGURES

For a more complete understanding of the present invention, reference is now made to the following descriptions taken in conjunction with the accompanying FIGURES, in which.

DETAILED DESCRIPTION

Figure 1:
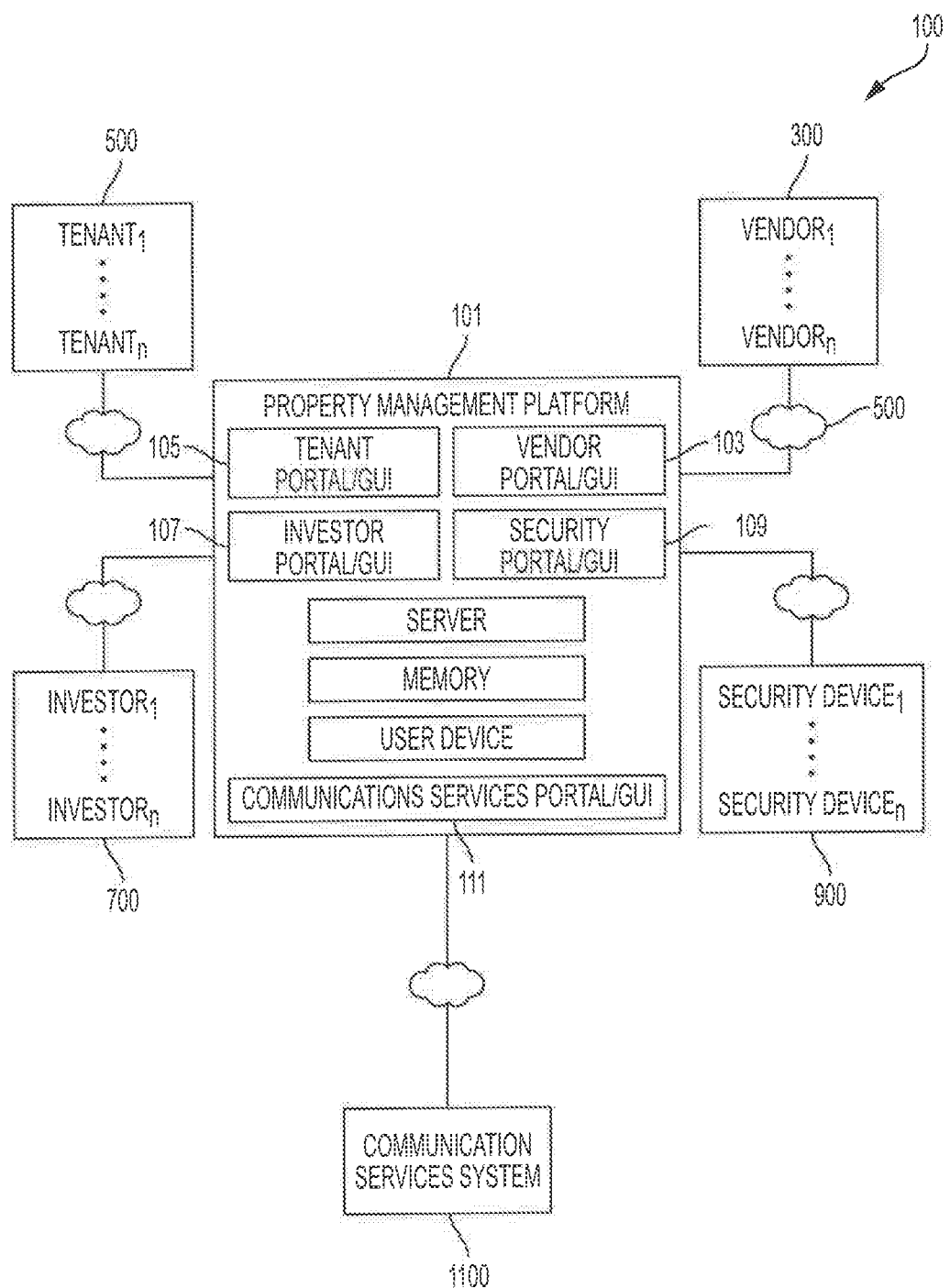
FIG. 1 illustrates aspects of an intelligent property management system according to described embodiments.

In view of the foregoing, described embodiments provide an intelligent property management system that utilizes a communication network comprising an intelligent property management platform in communication with other nodes via various portals to intelligently improve, e.g., maintenance, security, communication, vendors services, and investments relating to managed properties. FIG. 1 illustrates aspects of intelligent property management system 100, components of which can be centralized, distributed, and/or a combination thereof. According to the illustrated embodiment, intelligent property management system 100 comprises subsystems such as intelligent property management platform 101, each of which can comprise at least one or more servers, one or more memories, and one or more local or remote user devices. Accordingly, components of property management system 100 can be local and/or remote, centralized and/or distributed, and communicate wirelessly and/or via a wired connection with other system components.

One or more of the memories can organize stored data to accommodate redundancy, security, and enable a permanent indisputable record. Stored data can comprise one or more of databases, tables, logs, ledgers, block chains, and/or the like. Also, one or more memories can be formatted such that data can be stored in a centralized and/or decentralized manner. The one or more of the memories can comprise a non-transitory memory communicatively coupled to one or more processors (e.g., a server processor, a user device processor, and/or the like). The non-transitory memory can store code that, when executed, enables communicating data between property management platform 101 and other system components.

As described herein, during operation of intelligent property management system 100, intelligent property management platform 101 communicates with other system components via respective communication portals to enable described features. According to FIG. 1, intelligent property management platform 101 comprises one or more processors and memory coupled thereto, vendor portal 103, tenant portal 105, investor portal 107, security portal 109, and communications service portal 111. Intelligent property management platform 101 communicates with: (1) vendor system 300 via vendor portal 103, (2) tenant system 500 via tenant portal 500, (3) investor system 700 via investor portal 107, (4) security device system 900 via security device portal 109, and (5) and communication services system 1100 via communication services portal 111.

By way of example, during operation of system 100, wireless data structures communicated via vendor portal 103 comprises at least one of: a request for performance of a first vendor service at the tenant premises, a notification that the requested performance of the vendor service has been performed, and a request for performance of a second vendor service at the tenant premises. Wireless data structures communicated via tenant portal 105 comprises at least one of: a request for performance of a service from a tenant, a status update for a platform in a tenant premises, and an alarm for the platform in the tenant premises. Wireless data structures communicated via investor portal 107 comprises at least one of: a request for credential information associated with one or more investors and financial information associated with the property. Wireless data structures communicated via security portal 109 comprises at least one of: image data collected by one or more property security devices, an alarm generated by the one or more property security platforms, and geo-fence data Wireless data structures communicated via communication services portal 111 comprises at least one of quality of service data for the property communication service devices.

Further, utilizing intelligent property management platform 101, data received via the vendor portal, data received via the tenant portal, data received vial the investor portal, data received via the security device portal, and data received via the communication portal can be displayed to a user. The information is displayed to the user in respective, discrete display regions where each respective region in the display corresponds to particular portal. The displayed information can comprise instructions to the user to take one or more actions to ensure a vendor service is performed, an investor agreement is executed, a security measure is taken, or the like. Accordingly, the display is responsive to user selections to enable the functions described herein.

Consistent with the foregoing, according to the illustrated embodiment, intelligent management platform 101 communicates with one or more vendors (e.g., $vendor_1$-$vendor_n$) in vendor system 300 utilizing vendor portal 103. Vendor portal 103 can be a dedicated communication mechanism facilitating communication between intelligent management platform 101 and vendors (e.g., $vendor_1$-$vendor_n$) in vendor system 300 to enable performance of certain vendor functions described herein For example, wireless data communicated using vendor portal 103 can comprise one or more of a request for performance of a first vendor service at, e.g., a tenant premises, a notification that the requested performance of the vendor service has been performed, and a request for performance of a second vendor service at the tenant premises. Aspects of vendor system 300 are described in additional detail with respect to FIG. 3.

Intelligent management platform 101 communicates with one or more tenants (e.g., $tenant_1$-$tenant_n$) in tenant system 500 utilizing tenant portal 105. Tenant portal 105 can be a dedicated communication mechanism facilitating communication between intelligent management platform 101 and tenants (e.g., $tenant_1$-$tenant_n$) in tenant system 500 to enable performance of certain tenant functions described herein. For example, wireless data communicated using tenant portal 105 can comprise one or more of a requests for performance of a service received from a tenant, a status update for a device in a tenant premises, and an alarm for a device in the tenant premises. Aspects of tenant system 500 are described in additional detail with respect to FIG. 5.

Intelligent management platform 101 communicates with one or more investors (e.g., $investor_1$-$investor_n$) in investor system 700 utilizing investor portal 107. Investor portal 107 can be a dedicated communication mechanism facilitating communication between intelligent management platform 101 and investors (e.g., $investor_1$-$investor_n$) in investor system 700 to enable performance of certain investor functions described herein For example, wireless data communicated using investor portal 107 can comprise one or more of a request for credential information associated with a property investor, financial information associated with an intelligently managed property, and/or the like. Aspects of investor system 700 are described in additional detail with respect to FIG. 7.

Intelligent management platform 101 communicates with one or more security devices (e.g., $security device_1$-$security device_n$) in security device system 900 utilizing security portal 109. Security device portal 109 can be a dedicated communication mechanism facilitating communication between intelligent management platform 101 and security devices (e.g., $security device_1$-$security device_n$) in security device system 900 to enable performance of certain security device functions described herein. For example, wireless data communicated using security device portal 109 can comprise image data collected by one or more property security devices, alarm data generated by the one or more property security devices, and geo-fence status data. Aspects of security device system 900 are described in additional detail with respect to FIG. 9.

Intelligent management platform 101 communicates with one or more communication services (e.g., communication services$_1$-communication services$_n$) in communication services system 1100 utilizing communication services portal 111. Communication services portal 111 can be a dedicated communication mechanism facilitating communication between intelligent management platform 101 and communication services (e.g., communication service$_1$-communication service$_n$) in communication services system 1100 to enable performance of certain communication services functions described herein. For example, wireless data communicated using communication services portal 111 can comprise quality of service data for one or more security device, tenant mobile devices, smart appliances located on the property, and the like. Aspects of communication services system 1100 are described in additional detail with respect to FIG. 11.

According to an embodiment, the foregoing portals can be accessed by individuals or entities having specified credentials. As individual or entity can have access to more than one of the foregoing portals. Also, the portals themselves can be configured such that data communicated on one portal can be written to, read from, or otherwise accessible by other portals. For example, a tenant device can transmit a communication via the tenant portal, which can be directed to a vendor device via the vendor portal as well as receive communications in the reverse, while participant in each respective portal are able to simultaneously access the communication.

Notably, intelligent property management system 100 and its components can leverage Internet of Things (IOT) devices, such as smart devices, and distributed ledger technologies (DLT) to provide for more efficient and secure operations and transactions executed by system 100. Accordingly, for example, intelligent property management platform 101 can receive an alert or status information from a smart device in tenant system 500 via tenant portal 105, the received alert or status information can be recorded on a distributed ledger, and information associated with subsequent actions taken in response to the received information can be recorded. on a distributed ledger. In one instance, intelligent property management platform 101 can recognize the received status information as requiring that one or more of vendors in vendor system 300 300 perform a service. The request for the service, confirmation of performance of the service, and payment for performance of the service can all be recorded on the distributed ledger, which itself can be accessed based on user credentials.

Therefore, to seamlessly execute transactions (or discrete steps comprising same) performed by system 100, each of intelligent property management platform 101, vendors in vendor system 300, tenant nodes in tenant system 500 (which can be smart appliances in a tenant premises utilizing to IoT technologies), investor nodes in investor system 700, security devices in security device system 900 (which themselves can be smart devices utilizing IoT technologies), and communication services nodes in communication services system 1100 can negotiate and enforce agreements with others blockchain smart contracts. To do so, the foregoing nodes can execute code to: determine settlement amounts, transfer consideration upon confirmation of execution of a service, automatically pay vendors, tenants, and investors upon satisfaction of execution of smart contracts, collect and provide financial information to investors to a share registry, enforce majority or supermajority investor votes from a share registry, execute supply chain management, and chain of custody for an item, and execute peer-to-peer transactions between two nodes in the network that access the distribute ledger.

According to an embodiment, IoT machines, such as a smartphone utilized by a vendor in vendor system 300, smart appliances at a tenant location in tenant system 500, a smartphone utilized by an investor in investor system 700, or a security device in security device system 900, can negotiate smart contracts on their own (without human) and exchange items, e.g., payment, performance or a requested service, satisfaction of a specified condition, etc. In such instances, the smart contract operates as a computerized transaction protocol that executes the terms of a contract. According to embodiments, a smart contract can comprise the following fields: object of agreement, first party blockchain address, second party blockchain address, essential content of contract, signature slots and blockchain ID associated with the contract. During operation of system 100, a smart contract is sent to one or more recipients that open the payload and execute the terms of the contract. If the specified contractual conditions are met, then the smart contract can, e.g., authorize payment.

A similar process is used to provide secure communications between IoT devices, which is useful for edge IoT devices. Operating edge IoT devices ensures faster response times, reduced risks, and lower overall costs. Maintaining close proximity of data to edge devices, rather than transmitting data to a distant centralized cloud, minimizes latency, maximizes performance, and enables faster response times and more effective maintenance. Therefore, in addition to being highly secure, system 100 significantly reduces bandwidth requirements and the cost of managing widely By way of example, according to an embodiment, an IOT security device captures security data in proximity to an intelligently managed property and automatically transmits the captured data to intelligent property management platform 101, which can then shares the data with tenants via tenant portal 105 and/or transmits the data to a third party via communication services portal 111.

The security device ID and blockchain address is retrieved from security device memory and the security device attaches its blockchain address in a field, along with other fields receiving security device data. The security data is then stored at, e.g., an intelligent property management platform 101 database, marked with the platform blockchain address, and can be annotated with interpretive data and the like. The security data and interpretive data can then be transmitted from intelligent property management platform 101, along with an intelligent property management platform 101 ID and blockchain address, to tenant devices and other nodes in the network.

According to another embodiment, behavioral contracts are developed between a payer and a vendor to trigger payment for performance of a requested service. For instance, a smart contract could trigger release of a payment from intelligent property management platform 101 when intelligent property management platform 101 receives confirmation that a requested service (perhaps requested by a tenant in tenant system 500 or a security device in security device system 900) is performed. A second smart contract could trigger notification to, e.g., a tenant that the vendor has performed the requested service and that payment has been released to the vendor for doing so.

With respect to facilitating investments in an intelligently managed property, system 100 can provide crowd or group-based investing by utilizing the foregoing concepts to select a group of individual or entities as investors, provide a value (e.g., a return) to the selected investors at their respective blockchain addresses, and associate payment of the value with each respective block chain address as security for the value provided to the investor.

Figure 2:
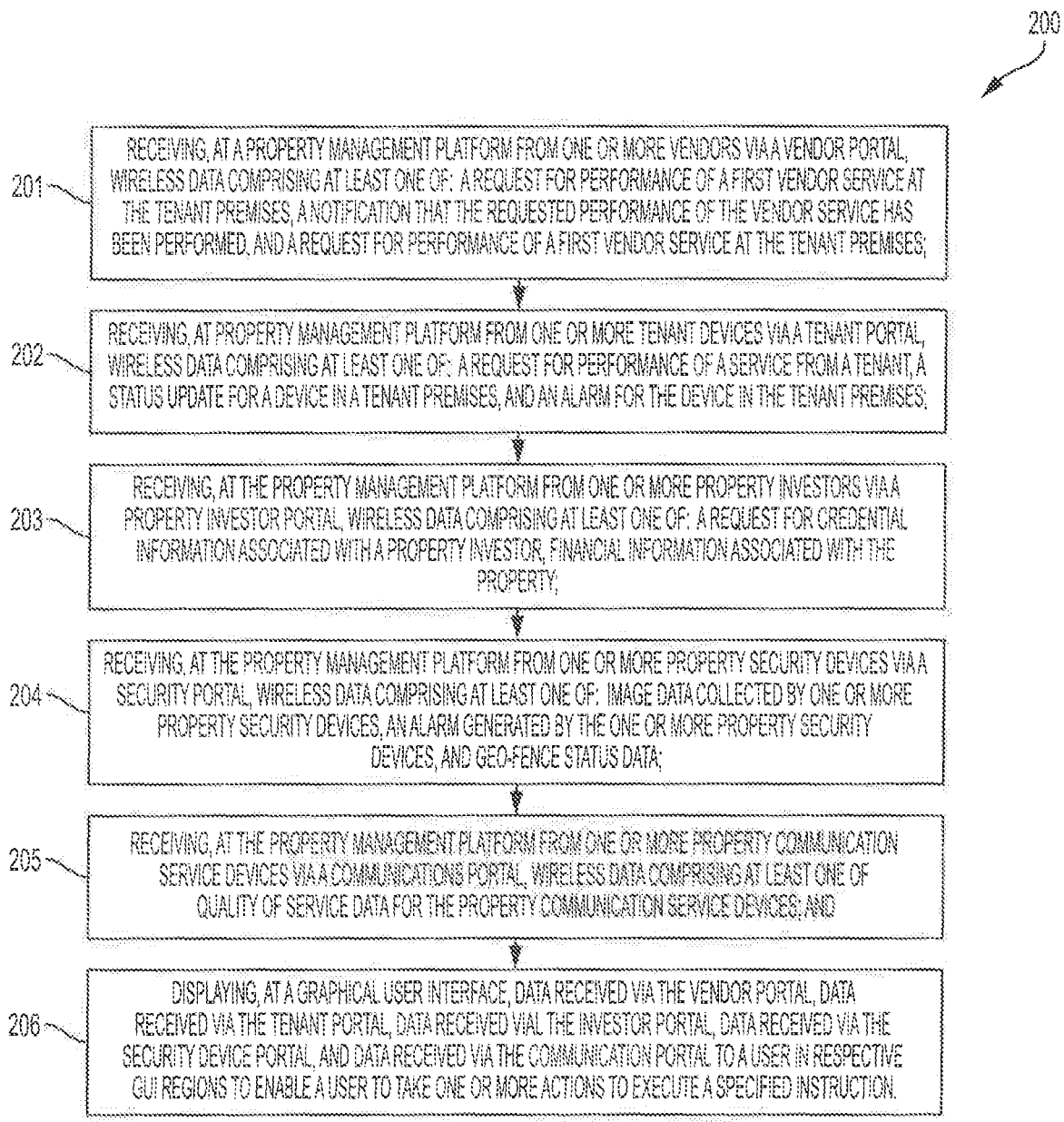
FIG. 2 illustrates aspects of steps performed by an intelligent property management system according to described embodiments.

FIG. 2 illustrates aspects of steps performed by an intelligent property management system according to described embodiments. Method 200 comprises steps performed by at least one embodiment of an intelligent property management platform according to inventive concepts described herein, such as intelligent property management platform 101, aspects of which are illustrated at FIG. 1.

At step 201, a property management platform receives, from one or more vendors via a vendor portal, wireless data The received data comprises, e.g., at least one of: a request for performance of a first vendor service at the tenant premises, a notification that the requested performance of the vendor service has been performed, and a request for performance of a first vendor service at the tenant premises. Generally, the property management platform transmits and receives vendor data communications to and from one or more vendor devices via the vendor portal. Vendor data communications can comprise various types of requests, notifications, reminders, confirmations, documents, status updates, status reports, invoices, calendar invites, monetary transaction communications, e-signatures, and/or the like. Example vendor data communications comprise, but are not limited to, a request for performance of a vendor service at a tenant premises, a notification that the requested performance of the vendor service has been performed, and/or a request for performance of a different vendor service at the tenant premises.

At step 202, the property management platform receives, from one or more tenant devices via a tenant portal, wireless data The received data comprises, e.g., at least one of: a request for performance of a service from a tenant, status information for a smart device in a tenant premises, and an alarm for the smart device in the tenant premises. The property management platform transmits and receives tenant data communications to and from one or more tenant devices via the tenant portal. Tenant data communications can comprise various types of requests, notifications, status updates, status reports, reminders, confirmations, invoices, calendar invites, monetary transaction communications, e-signatures, and/or the like. For example, a tenant data communication can comprise a status update regarding a device (e.g., thermostat) in a tenant premises, an alarm from a device in the tenant premises, and/or a tenant request for services (e.g., carpet cleaning). At step 204, a management platform can generate one or more records including the received tenant data communication and store the one or more records. In embodiments, the one or more records are made secure and redundant according to a block chain and/or a distributed ledger.

At step 203, the property management platform receives, from one or more property investors via a property investor portal, wireless data. The received data comprises, e.g., at least one of: credential information associated with a property investor, financial information associated with one or more intelligently managed properties, value information associated with an investment in the one or more intelligently managed properties. The a property management platform transmits and receive. Investor data communications to and from one or more property investor devices via the investor portal, and investor data communications can comprise various types of requests, verifications, notifications, documents, status updates, status reports, reminders, confirmations, invoices, calendar invites, monetary transaction communications, e-signatures, and/or the like. For example, an investor data communication can be a request for credential information associated with a property investor or financial information associated with the property.

At step 204, the property management platform receives, from one or more property security devices via a security portal, wireless data. The received data comprises, e.g., at least one of; image data collected by one or more property security devices, an alarm generated by the one or more property security devices, and geo-fence status data. The property management platform transmits and receives security data communications to and from one or more security devices via the security portal. A security data communication can comprise various types of alarms, recordings, images, sensory data, detection data, testing data, resolution data, containment data, threat resolution data, requests, verifications, notifications, documents, status updates, status reports, reminders, confirmations, calendar invites, and/or the like. For example, an security data communication can be image data collected by one or more property security devices, an alarm generated by the one or more property security devices, or geo-fence status data.

At step 205, the property management platform receives, from one or more property communication service devices via a communications portal, wireless data. The received data comprises, e.g., at least one of: quality of service information for one or more security devices, quality of service information for one or more tenant devices, and quality of service information for one or more vendor devices. The property management platform transmits and receives communications-service data communications to and from one or more communication service devices via the communications portal. Communications-service data communications can comprise various types of alarms, recordings, images, sensory data, detection data, testing data, resolution data, containment data, threat resolution data, requests, verifications, notifications, status updates, status reports, reminders, confirmations, calendar invites, and/or the like. For example, communications-service data communications can be quality of service data of the property communication service devices.

At step 206 information comprising at least one of: data received via the vendor portal, data received via the tenant portal, data received vial the investor portal, data received via the security device portal, and data received via the communication portal is displayed to a user. The information is displayed to the user in respective, discrete display regions where each respective region in the display corresponds to particular portal. The displayed information can comprise instructions to a user to take one or more actions to ensure a vendor service is performed, an investor agreement is executed, a security measure is taken, or the like. Accordingly, the display is responsive to user selections to enable the foregoing functions.

It should be appreciated that, during operation, the intelligent property management platform can generate and store one or more records relating to: wireless data received from a vendor, wireless data received from a tenant, wireless data received from an investor, wireless data received from a security device, and wireless data received from a communications service. Further, when triggered, the management platform can process one or more stored records to create a new record. In embodiments, the one or more records are made secure and redundant according to a block chain and/or a distributed ledger.

Figure 3:
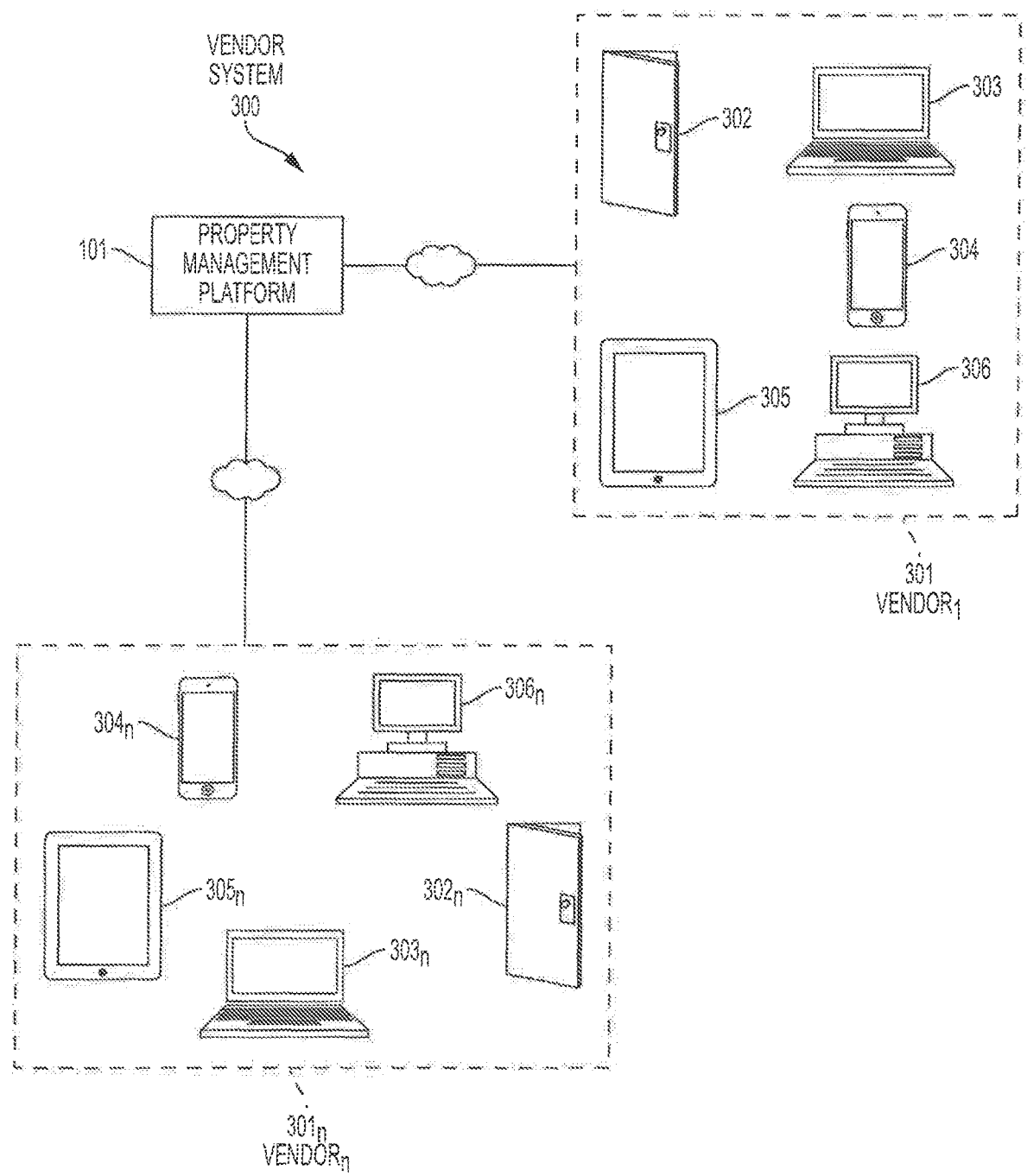
FIG. 3 illustrates aspects of a vendor system according to described embodiments.

FIG. 3 illustrates certain aspects of vendor system 300 according to described embodiments. Vendor system 300 communicates with property management platform 101, which comprises features described herein causing code, that when executed, enables the vendor system 300 to perform functions described herein.

Vendor system 300 can comprise a plurality of vendors 301-301$_n$ of diverse trades located at various locations. Example vendors comprise supply vendors who supply materials and/or other products, for example, paint supply vendors, plumbing supply stores, carpet suppliers, security supply dealers, communication supply merchants, construction material outlets, electronics traders, department stores, and/or online dealers (e.g., Amazon.com, eBay.com, Wayfair.com, and/or the like). Example vendors comprise service vendors who provide services, for example, maintenance services, plumbing services, security services, monitoring services, painting services, cleaning services, flooring replacement and/or cleaning services, electrical repair and installation services, delivery services, dog walking services, communication services (e.g., Internet, cable TV, phone, etc.), tax services, legal services, financial services (e.g., a bank) and/or the like. Example vendors can comprise emergency services that are privately and/or publicly available, for example, fire departments, police departments, emergency medical services, and/or the like.

An example vendor 301 can utilize one or more vendor devices to communicate via the vendor portal. Example vendor devices comprise but are not limited to mobile devices, such as tablet 305, smart phone 304, laptop 303, as well as stationary devices, such as desktop 306 and smart door 302. One or more vendor device can execute code thereon received from a property management platform which presents a graphical user interface (GUI) on the vendor device that gives the vendor access to the vendor portal. One or more agents of a vendor can have exclusive or shared access to one or more vendor devices. Vendor credentials can provide controlled. access to the vendor device, the vendor portal, and/or any of the portals discussed herein The vendor credentials can identify the vendor as well as the acting and/or communicating vendor agent.

The vendor credentials can provide tiered privileges, where lower tier (e.g., trainee) privileges provide reduced access functionality of the vendor device and/or vendor portal, moderate tier (e.g., employee) privileges provide moderate access functionality of the vendor device and/or vendor portal, and administrative tier (e.g., admin and/or owner) privileges provide full access functionality of the vendor device and/or vendor portal. Vendor credentials and privileges associated thereto can be controlled by a vendor 301, a management platform 101, and/or some combination thereof. Further, a vendor agent can access one or more of the portals using a device of another. For example, a vendor agent can use a smart door 302 at a tenant's premises to access the vendor portal and/or the other portals according to access privileges assigned to vendor credentials.

Figure 4:
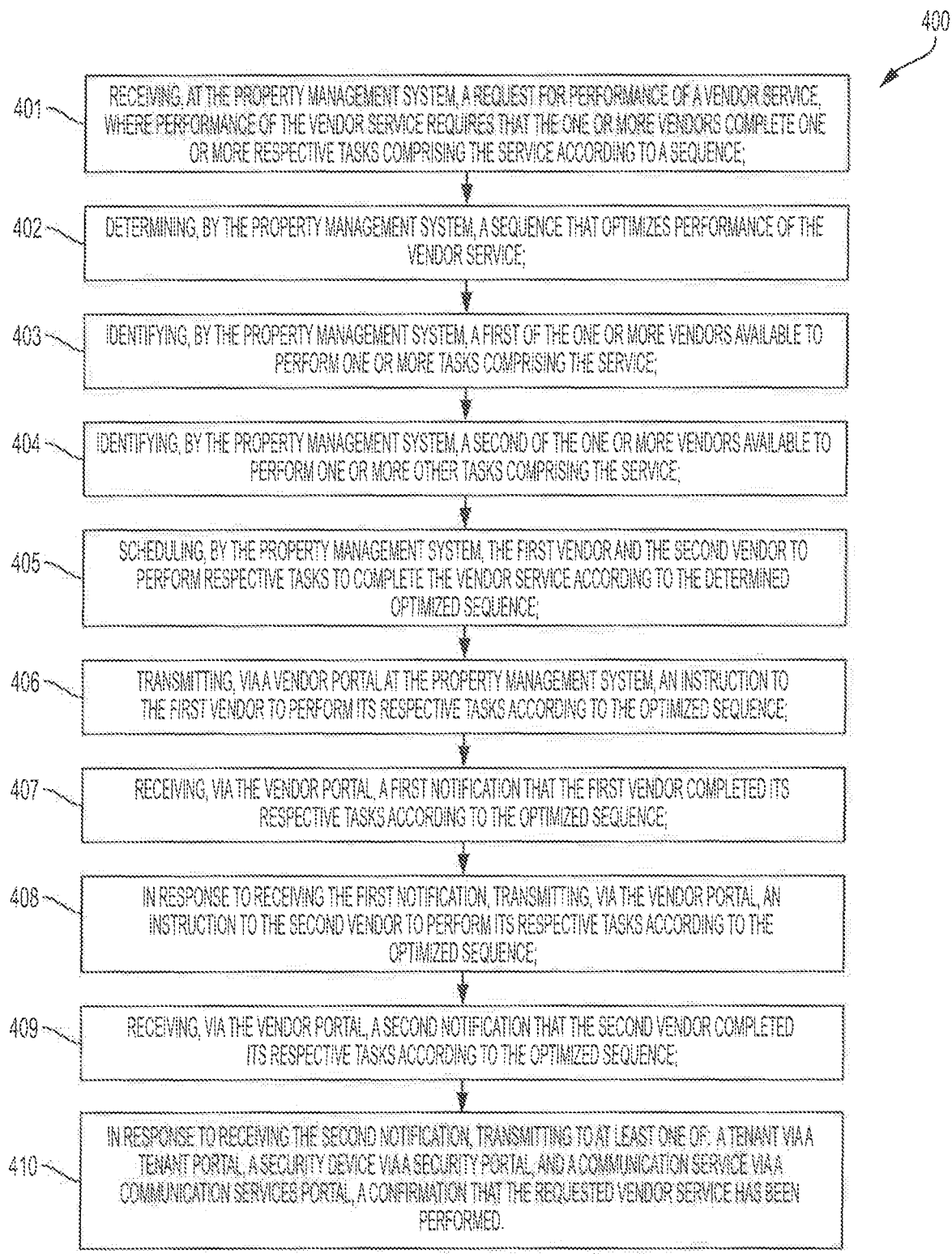
FIG. 4 illustrates aspects of steps performed by a vendor system according to described embodiments.

FIG. 4 illustrates aspects of steps performed by an intelligent property management system and/or a vendor system according to described embodiments. Specifically, method 400 comprises steps performed by at least one embodiment of an intelligent property management platform and/or vendor system according to inventive concepts described herein, such as intelligent property management platform 101 and/or vendor system 300, aspects of which are illustrated at FIG. 1 and FIG. 3, respectively.

At step 401, a property management system receives a request for performance of a vendor service. Performance of the vendor service can require that the one or more vendors complete one or more respective tasks comprising the service according to a sequence. A request can also be in the form of an indicator or the like. Accordingly, the property management platform can receive an indicator recommending a service be performed. Such indicators can be received in a plurality of forms and from a plurality of sources including devices that communicate via any of the portals disclosed herein. In embodiments, the recommended service can comprises more than one service calls the compilation of Which make no the recommended service. Example indicators comprise but are not limited to, calendar appointments recommending a scheduled maintenance service (e.g., monthly air filter change, yearly gate inspection, etc.), an alert from a security device (e.g., low battery alert on a smoke detector, smoke alert from a smoke detector, etc.), a request from a vendor device (e.g., message indicating new carpet is recommended, message indicating parts needed for a dishwasher, etc.), a request from a tenant device (e.g., a message indicating a clogged sink, a request for a cleaning service, etc.), an notice from a tenant device (e.g., a move-out notice, a notice of a new pet, etc.), an alert from a communication service device (e.g., a failure alert regarding a router, a quality of service alarm, etc.), and/or the like.

At step 402, the property management system determines a sequence that optimizes performance of the vendor service. As explained, the requested or indicated service request can comprise more than one service from a respective vendor, the compilation of which make up the requested or indicated service. For instance, an indicator can be a move-out notice received via a tenant portal from a tenant using a tenant device. From the move-out notice, the property management platform determines the indication is recommending a move out service, which is a recommended service having a plurality of service calls therein.

According to one embodiment, the property management platform determines a service performance sequence and displays the service performance sequence to a property management via a graphical user interface at a property management platform. A service performance sequence can identify which service calls, of a plurality of service calls, will be performed. For example, the property management platform can determine that the service performance sequence of a move-out service comprises a maid cleaning service call, a carpet cleaning service call, a painting service call, an appliance inspection service call, and a final inspection service call. A recommended service is considered performed upon the performance of each service call of the service performance sequence. For example, the move-out service would be considered performed after performance of each of the following: the maid cleaning service call, the carpet cleaning service call, the painting service call, the appliance inspection service call, and the final inspection service call.

At step 403, the property management system identifies a first of the one or more vendors available to perform one or more tasks comprising the service. Data relating to the first of the one or more vendors is displayed to the property management via the graphical user interface at the property management platform, and the property management can use the displayed data to determine which vendor and/or vendors the property management prefers at that time. The property management platform receives data indicating the property management selection of the first of the one or more vendors to perform one or more service calls. A user of the property management platform can indicate their selection via the graphical user interface (GUI) by electing an option offered by an application running on a property management user device that is part of the property management platform.

At step 404, the property management system identifies a second of the one or more vendors available to perform one or more other tasks comprising the service. Data relating to the second of the one or more vendors is displayed to the property management via the graphical user interface at the property management platform, and the property management can use the displayed data to determine which vendor and/or vendors the property management prefers at that time. The property management platform receives data indicating the property management selection of the second of the one or more vendors to perform one or more service calls. A user of the property management platform can indicate their selection via the graphical user interface (GUI) by electing an option offered by an application running on a property management user device that is part of the property management platform.

In embodiments, the property management can indicate tiered choices for vendors. For example, the property manager can select $vendor_1$ to perform the maid cleaning service call, can indicate that $vendor_2$ is their first choice for the carpet cleaning service call while $vendor_3$ is their second choice for the carpet cleaning service call. Further, the property management can comprise an number of parameter and/or conditions with their selections. For example, a property management can indicate that if $vendor_1$ accepts service $call_1$, service $call_2$, and service $call_3$, within x time period, then vendors is the first choice. If however, $vendor_1$ accepts service $call_1$ and service $call_2$, within x time period, and rejects service $call_3$, then $vendor_1$ is the first choice for service call and the second choice for service $call_2$.

The property management platform can be further configured select from a group of vendors classified as handling one or more service calls without input from the property management. In examples, one or more of the following schemes can be used alone or in combination: a round robin scheme, a rating system based on tenants' and/or property managements' rating of a vendor, and/or any other selection scheme.

At step 405, the property management system schedules the first vendor and the second vendor to perform respective tasks to complete the vendor service according to the determined optimized sequence. The property management platform can base the scheduling at least on the received data indicating the property management selection of the one or more vendors. Further, when scheduling a vendor, the property management platform can take into account timing of the various service calls as well as the vendors' schedules. In embodiments, the property management platform can transmit queries to one or more vendor for a service call soliciting scheduling information from the vendor. The property management platform can further base the scheduling on information received from one or more vendor regarding their availability to perform a service call, the vendor's pricing, and/or other vendor provided information. In embodiments, calendars can be shared and the property management platform can use information from calendar applications to performing scheduling. Scheduling can further be based on shipping information of one or more ordered supplies associated with a service call. For example, an electrician can be scheduled after the expected delivery date of a ceiling fan. In embodiments, the property management platform can create a schedule identifying which service calls should be performed during which time periods (e.g., which days) by which vendors, and if desired, the schedule can be flexible and amendable before and/or during performance of the recommended service.

At step 406, the property management system transmits an instruction to the first vendor to perform its respective tasks according to the optimized sequence. The property management platform transmits instructions to the first vendor via the vendor portal instructing the first vendor to perform the first service call of the service performance sequence. If desired, the instruction can identify a time period within which the service call should be performed and an expected price for the service call. In embodiments, this instruction can be recorded in one or more records as an offer of a smart contract. Further, upon the first vendor deciding to accept the offer, the property management platform receives a response indicating the first vendor has agreed to perform the requested service call. If desired, the response can identify a time period within which the first service call will be performed and an expected price for the service call. In embodiments, this response can be recorded in one or more records as an acceptance of a smart contract. Further, the response can be associated with the instruction such that one or more records show the response and instruction as being part of an open smart contract.

Thereafter, it is expected that the vendor performs their scheduled service call according to the scheduling. While a vendor is performing their service call, the vendor can determine that an additional service call should be added to the service performance sequence. If so, the vendor can transmit a message to the property management platform recommending an additional service call be added to the service performance sequence. If the service call is determined to be added to the service performance sequence, be property management platform performs one or more of the above steps to add the new service call to the service performance sequence.

At step 407, the property management system receives, via the vendor portal, a first notification that the first vendor completed its respective tasks according to the optimized sequence. The property management platform receives via the vendor portal, a notification that the first vendor completed performance of the first service call. In embodiments, the notification can be comprised in one or more record showing performance of the smart contract is complete. Further, based at least on an indication that the performance of the first service call has been completed, the property management platform can direct payment for the first service call to the first vendor's financial institution of choice. In embodiments, the first vendor's financial institution of choice can be preregistered with the property management platform, such that payment is directed to the first vendor's account automatically.

At step 408, the property management system, in response to receiving the first notification, transmits, via the vendor portal, an instruction to the second vendor to perform its respective tasks according to the optimized sequence. The property management platform transmits instructions to the second vendor via the vendor portal instructing the second vendor to perform the second service call of the service performance sequence. If desired, the instruction can identify a time period within which the service call should be performed and an expected price for the service call. In embodiments, this instruction can be recorded in one or more records as an offer of a smart contract. Further, upon the second vendor deciding to accept the offer, the property management platform receives a response indicating the second vendor has agreed to perform the requested service call. If desired, the response can identify a time period within which the second service call will be performed and an expected price for the service call. In embodiments, this response can be recorded in one or more record's as an acceptance of a smart contract. Further, the response can be associated with the instruction such that one or more records show the response and instruction as being part of an open smart contract.

Based on the received notification of completed performance, the property management platform transmits via a vendor portal, an instruction to the next vendor in the service performance sequence. The instruction can inform the next vendor that the premises is ready for the next service call. The instruction can further inform the next vendor of newly discovered issues reported by one or more of the previous vendors of the service performance sequence. This process can be repeated for each vendor of the service performance sequence the service performance sequence is complete.

At step 409, the property management system receives via the vendor portal, a second notification that the second vendor completed its respective tasks according to the optimized sequence. The property management platform receives via the vendor portal, a notification that the second vendor completed performance of the second service call. In embodiments, the notification can be comprised in one or more record showing performance of the smart contract is complete. Further, based at least on an indication that the performance of the second service call has been completed, the property management platform can direct payment for the second service call to the second vendor's financial institution of choice. In embodiments, the second vendor's financial institution of choice can be preregistered with the property management platform, such that payment is directed to the second vendor's account automatically.

After the last service call of the service performance sequence is finished, the last vendor will transmit notification that their service call is complete. The property management platform receives the final notification that a final vendor completed performance of a final service call of the service performance sequence, and the property management platform transmits the property management platform a service complete notice. If desired, the service complete notice can be comprised in one or more record identifying completion, of the recommended service.

At step 410, the property management system, in response to receiving the second notification, transmits to at least one of: a tenant via a tenant portal, a security device via a security portal, and a communication service via a communication services portal, a confirmation that the requested vendor service has been performed. For example, the graphical user interface on the vendor device can provide a form that the vendor fills out in order to submit a payment request. These forms can standardize invoices for the property management platform. The payment request can be stored in one or more record in association with the smart contract of the service call. In embodiments, the property management platform can withhold payment until receipt of a properly submitted payment request. This process can be repeated for each vendor of the service performance sequence.

Figure 5:
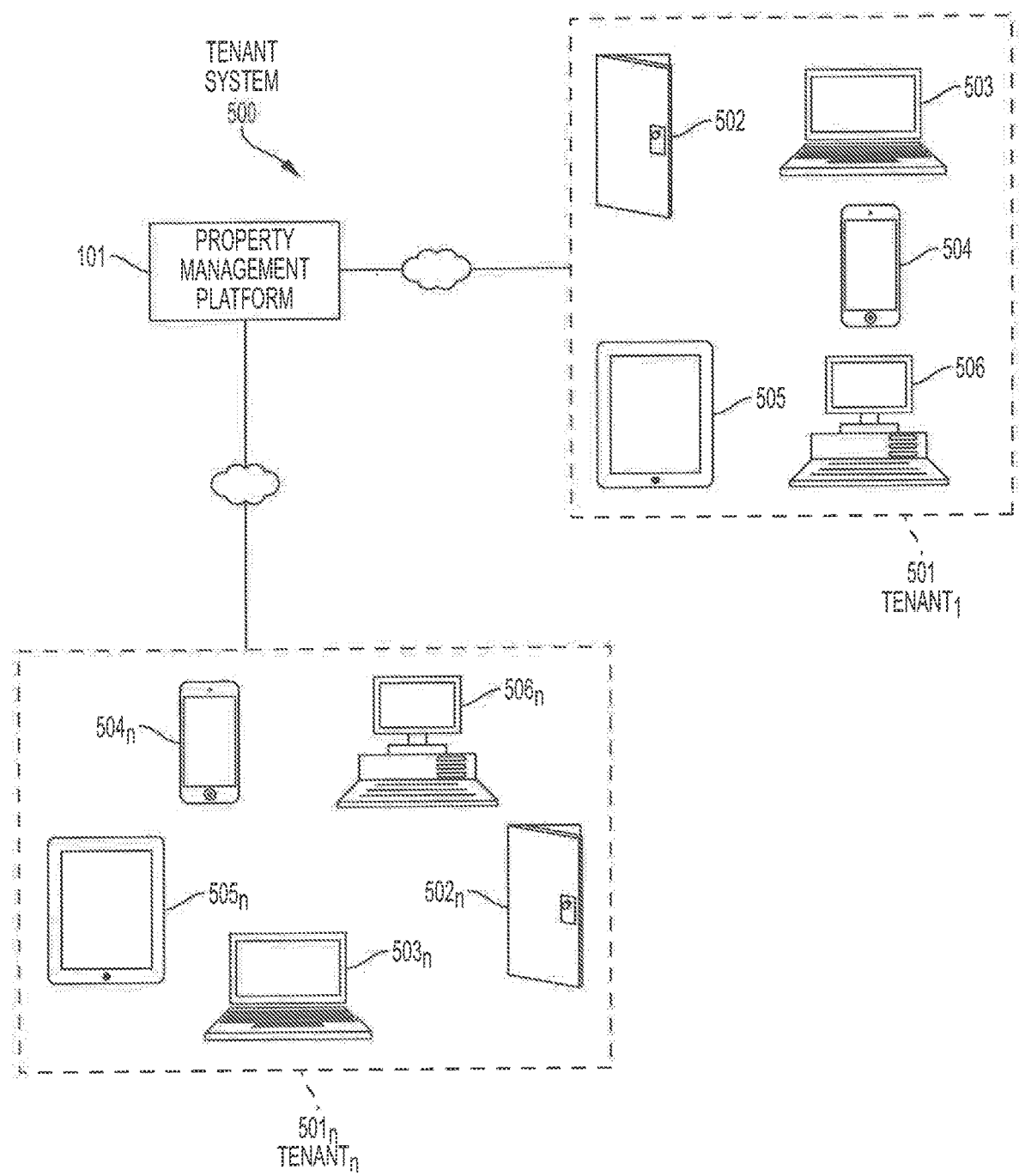
FIG. 5 illustrates aspects of a tenant system according to described embodiments.

FIG. 5 illustrates certain aspects of tenant system 500 according to described embodiments. The tenant system 500 communicates with property management platform 101, which comprises features described herein that cause code, when executed, to enable tenant system 500 to perform functions described herein. Tenant system 500 can comprise a plurality of tenants 501-501$_n$, of one or multiple facilities (e.g., apartment complex).

An example tenant 501 can utilize one or more tenant device to communicate via the tenant portal 500. Example tenant devices comprise but are not limited to mobile devices, such as tablet 505, smart phone 504, laptop 505, as well as stationary devices, such as desktop 506 and smart door 502. One or more tenant device can execute code thereon received from a property management platform which presents a graphical user interface (GUI) on the tenant device that gives the tenant access to the tenant portal. One or more tenants can have exclusive or shared access to one or more tenant devices. Tenant credentials can provide controlled access to the tenant device, the tenant portal, and/or any of the portals discussed herein. The tenant credentials can identify the tenant as well as the premises occupied by with the tenant.

The tenant credentials can provide tiered privileges, where lower tier (e.g., non-paying tenant, children, and/or a subtenant) privileges provide reduced access functionality of the tenant device and/or tenant portal and administrative tier (e.g., admin and/or paying tenant) privileges provide increased access functionality of the tenant device and/or tenant portal. Tenant credentials and privileges associated thereto can be controlled by a tenant 501, a property management platform 101, and/or some combination thereof. Further, a tenant can access one or more of the portals using a device of another. For example, a tenant can use a smart door 502 at another tenant's premises to access the tenant portal and/or the other portals according to access privileges assigned to tenant credentials.

Figure 6:
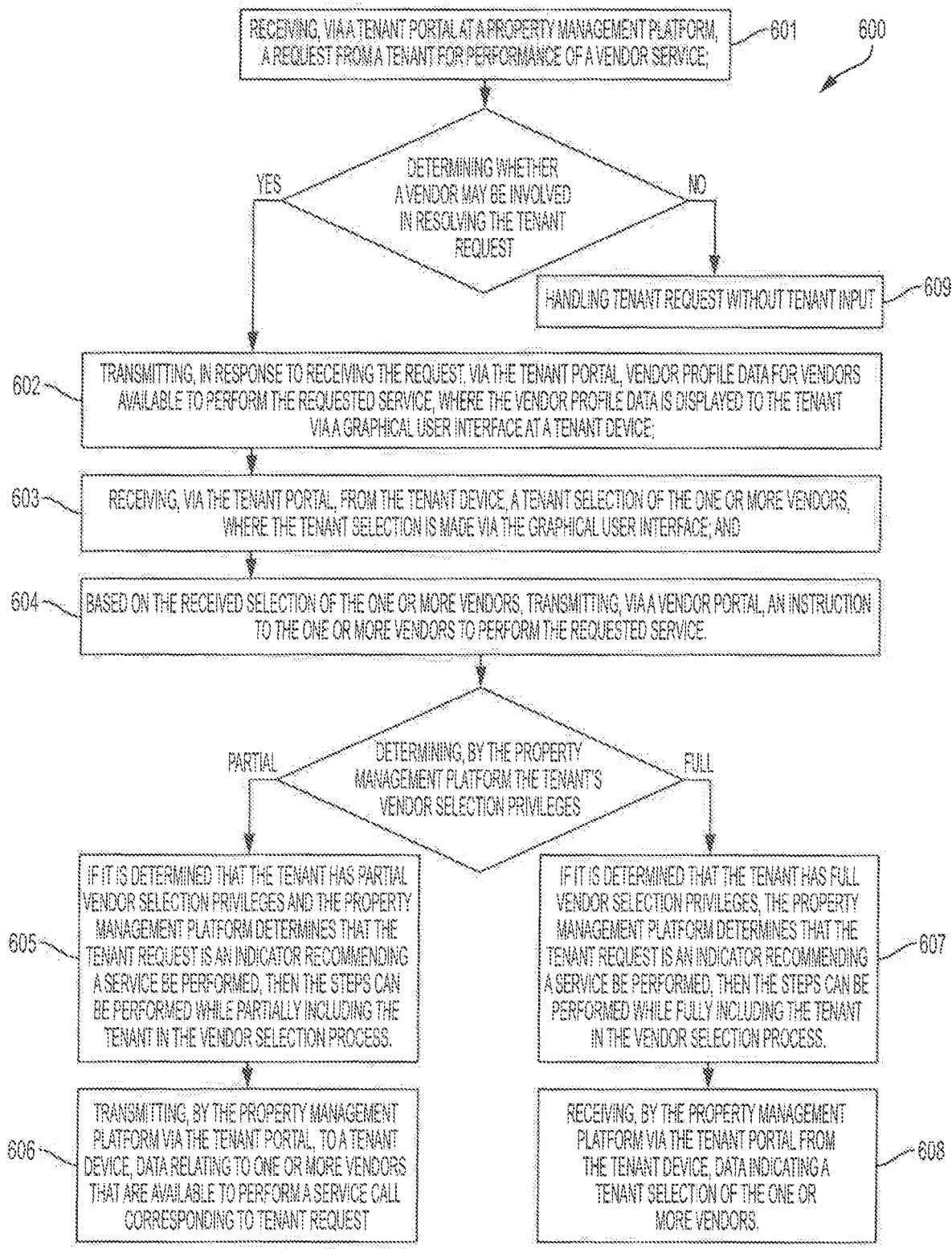
FIG. 6 illustrates aspects of steps performed by a tenant system according to described embodiments.

FIG. 6 illustrates aspects of steps performed by an intelligent property management system and/or a tenant system according to described embodiments. Specifically, method 600 comprises steps performed by at least one embodiment of an intelligent property management platform and/or tenant system according to inventive concepts described herein, such as intelligent property management platform 101 and/or tenant system 500, aspects of which are illustrated at FIG. 1 and FIG. 5, respectively.

At step 601, a property management platform receives, via a tenant portal, a tenant request for performance of a vendor service. In embodiments, the tenant request can be recorded in one or more records as part of a tenant service record in a block chain and/or on a distributed ledger. Example services comprise maintenance request, supply request, cleaning requests, emergency medical services, payment request, electronic quality of service test requests, amenities request, delivery requests, food request, medical care requests, butler services request, lease renewal request, move-out notices, additional occupant notice, new pet notices, and/or the like. In embodiments, the tenant request can be a representation of selections made by the tenant of options provided by the GUI of the tenant device.

At step 602, the property management platform transmits, in response to receiving the request, via the tenant portal, vendor profile data for vendors available to perform the requested service. The vendor profile data can be displayed to the tenant via a graphical user interface at a tenant device, in doing so, the property management platform can determine whether a vendor can be involved in resolving the tenant request. If it is determined that the tenant has no vendor selection privileges and the property management platform determines that the tenant request is an indicator recommending a service be performed, then the steps can be performed without further tenant input.

At step 603, the property management platform receives, via the tenant portal, from the tenant device, a tenant selection of the one or more vendors, The tenant selection can be made via the graphical user interface.

At step 604, the property management platform, based on the received selection of the one or more vendors, transmits, via a vendor portal, an instruction to the one or more vendors to perform the requested service.

Optionally, at step 605, if it is determined that the tenant has partial vendor selection privileges and the property management platform determines that the tenant request is an indicator recommending a service be performed, then the steps can be performed while partially including the tenant in the vendor selection process. For example, a tenant can have the privilege to select vendors (e.g., maintenance man) who enter their premises but not have the privilege to select vendors who will not enter their premises (e.g., supply vendor).

At step 606, the property management platform can transmit, via the tenant portal, to a tenant device, data relating to one or more vendors that are available to perform a service call corresponding to tenant request. That being said, the data can be limited to vendors that perform services within the tenant's selection privileges. According to the previous example, data about maintenance service vendors can be provided to the tenant device hut data about a supply vendor cannot be provided to the tenant device.

At step 607, if it is determined that the tenant has full vendor selection privileges, the property management platform determines that the tenant request is an indicator recommending a service be performed, then the steps can be performed while fully including the tenant in the vendor selection process. With full privileges, data regarding any or all of the vendors that are being considered to perform a service call of the sequence of service calls can be transmitted to the tenant device. A tenant's vendor selected privileges can be identified according to their tenant credentials. A tenant's vendor selections can be influential to the selection process and/or absolute selections.

The data relating to the one or more vendors can be caused to display on the tenant devices via the GUI and can provide the vendor data information. Data relating to a vendor can comprise, but is not limited to, vendor rating information, services performed by the vendor, vendor reviews, vendor scheduling availability, vendor experience, employee information (e.g., background check information) of the vendor, costs, vendor contact information, and more. In embodiments, the data can be recorded in one or more records in association with the tenant request as part of the tenant service record in a block chain and/or on a distributed ledger.

At step 608, the property management platform can receive, via the tenant portal from the tenant device, data indicating a tenant selection of the one or more vendors. For example, the tenant can select a dishwasher repair vendor and/or select a dishwasher parts supply company. The selections are made via the GUI that is caused to be displayed on the tenant device. The selections can be recorded in one or more records in association with the tenant request as part of the tenant service record in a block chain and/or on a distributed ledger. The tenant can indicate tiered selections as well as add parameters and/or conditions to their selections. In embodiments, the selections can be recorded in one or more records as part of the tenant service record and/or the recommended service record in a block chain and/or on a distributed ledger.

Regardless a tenant's vendor selection privileges, the property management platform can transmit to the tenant device notifications regarding service calls of a service performance sequence before and/or during performance of a recommended service. In embodiments, a tenant can be sent notification o the services to be performed, information about the vendors scheduled to perform the services, notifications upon completion of various portions of the service performance sequence, shipping information and delivery confirmations, as well as notification of completion of performance of the recommended service.

In embodiments, in response to the property management platform receiving a vendor completion notification from a vendor via the vendor portal, the property management platform can transmit a confirmation request to a tenant device via the tenant portal. The confirmation request can request confirmation that the vendor performed all the services according to the service call and can request rating information regarding the vendor's quality of service. If desired, a vendor's payment can be held until the property management platform receives a confirmation from the tenant that work has been performed to satisfaction. Further, the tenant confirmation can be a used to determine whether to transmit a notice to the next vendor of the service performance sequence indicating that their service call is next in the queue. Upon the property management platform receiving a response to the confirmation request, the tenant's confirmation can be stored as one or more records in association with the smart contract, the recommended service record, and/or tenant request record. Further, the rating information can be utilized by the property management platform to rate the vendor and effect vendor selections in the future.

At step 609, if the property management platform determines that a vendor cannot be involved in resolving the tenant request, the tenant request is handled without tenant input. Examples of requests that do not involve vendors comprise but are not limited to lease agreement requests, lease transfer requests, and tenant payment requests. For example, the property management platform can receive a request from a tenant to enter into a lease agreement for certain premises. The lease agreement request can be stored as one or more record of a small lease contract. In response, to the lease agreement request, the property management platform can transmit a response accepting the tenant lease agreement request. The response accepting the tenant lease agreement request can be stored as one or more record in association with the tenant lease agreement request as another part of the smart lease contract. The request and/or response can comprise the terms of the lease including but not limited to identification of the premises, term of the lease and cost) of the lease. Of course, the operation can be performed in reverse where the property management platform can initiate the lease agreement and the tenant device can accept the lease agreement.

In other examples, the property management platform can receive a request to electronically pay moneys owed (e.g., rent, utilities, fines, deposits, communication services, etc.) from a tenant via the tenant portal. In this example, the tenant can use a credit card or routing information to direct money from a tenant's financial institution to the property management's financial institution. A tenant could make selections on the GUI of the tenant device to set up automatic payment options for rent, utilities, communication fees, and more if desired.

Figure 7:
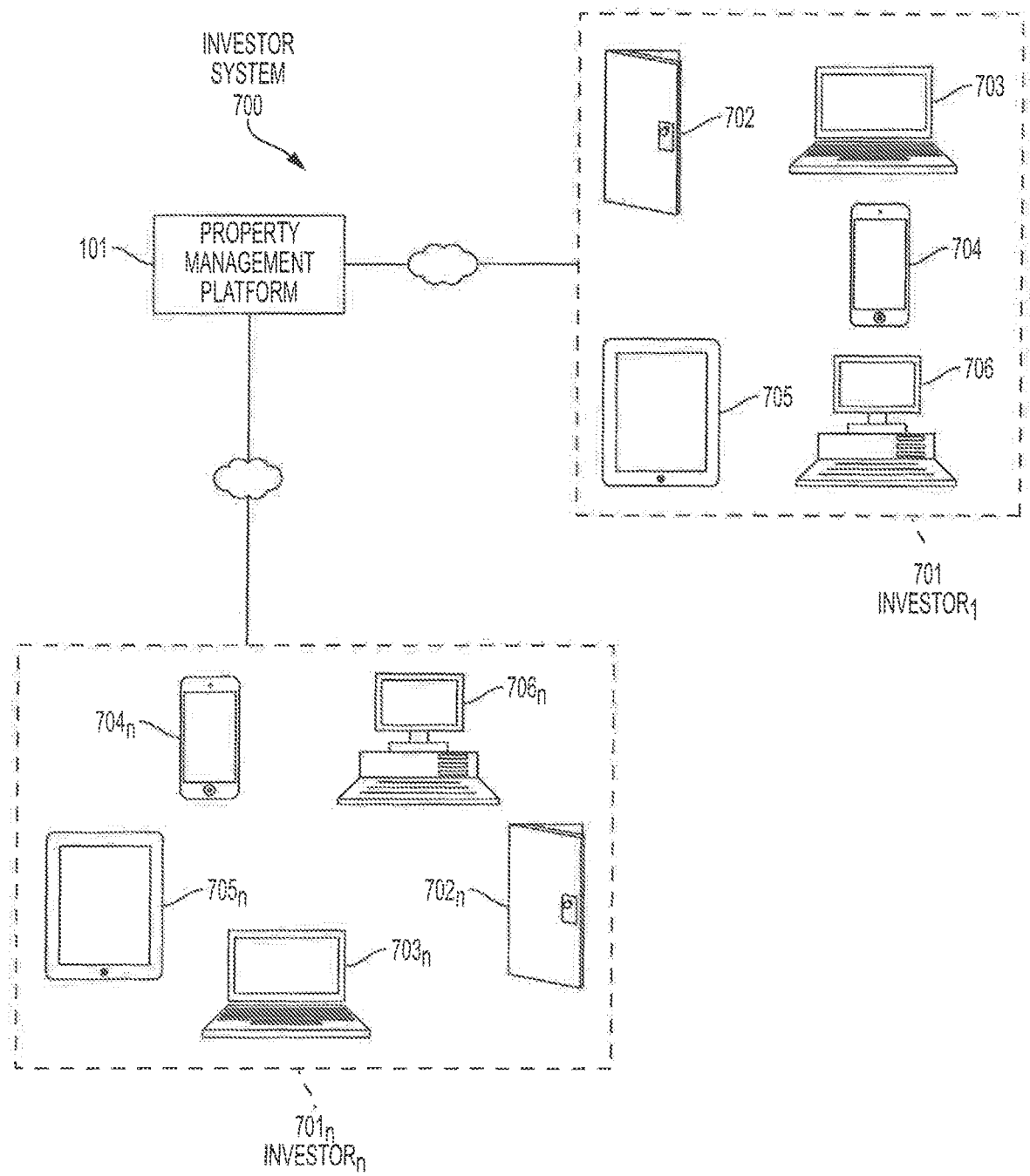
FIG. 7 illustrates aspects of a property investor management system according to described embodiments.

FIG. 7 illustrates certain aspects of investor system 700 according to described embodiments. The investor portal system 700 communicates with property management platform 101, which comprises features described herein causing code, that when executed, enables investor portal system 700 to perform functions described herein. Investor portal system 700 can comprise a plurality of investors 701-701$_n$ distributed throughout various locations.

An example investor 701 can utilize one or more investor devices to communicate via the investor portal 700. Example investor devices comprise but are not limited to mobile devices, such as tablet 705, smart phone 704, laptop 705, as well as stationary devices, such as desktop 706 and smart door 702. One or more investor device can execute code thereon received from a property management platform which presents a graphical user interface (GUI) on the investor device that gives the investor access to the investor portal 700. One or more investors can have exclusive or shared access to one or more investor devices. Investor credentials can provide controlled access to the investor device, the investor portal, and/or any of the portals discussed herein. The investor credentials can identify the investor and/or an agent of the investor.

The investor credentials can provide tiered privileges, where lowest tier (e.g., silent investor) privileges provide reduced access functionality of the investor device and/or investor portal 700, and a highest tier (e.g., controlling investor and/or administrator) privileges provide increased access functionality of the investor device and/or investor portal 700. Of course, privileges of any level therebetween can be provided, as is desired. Investor credentials and privileges associated thereto can be controlled by an investor 701, a property management platform 101, and/or some combination thereof. Further, an investor can access one or more of the portals using a device of another as described above.

Figure 8:
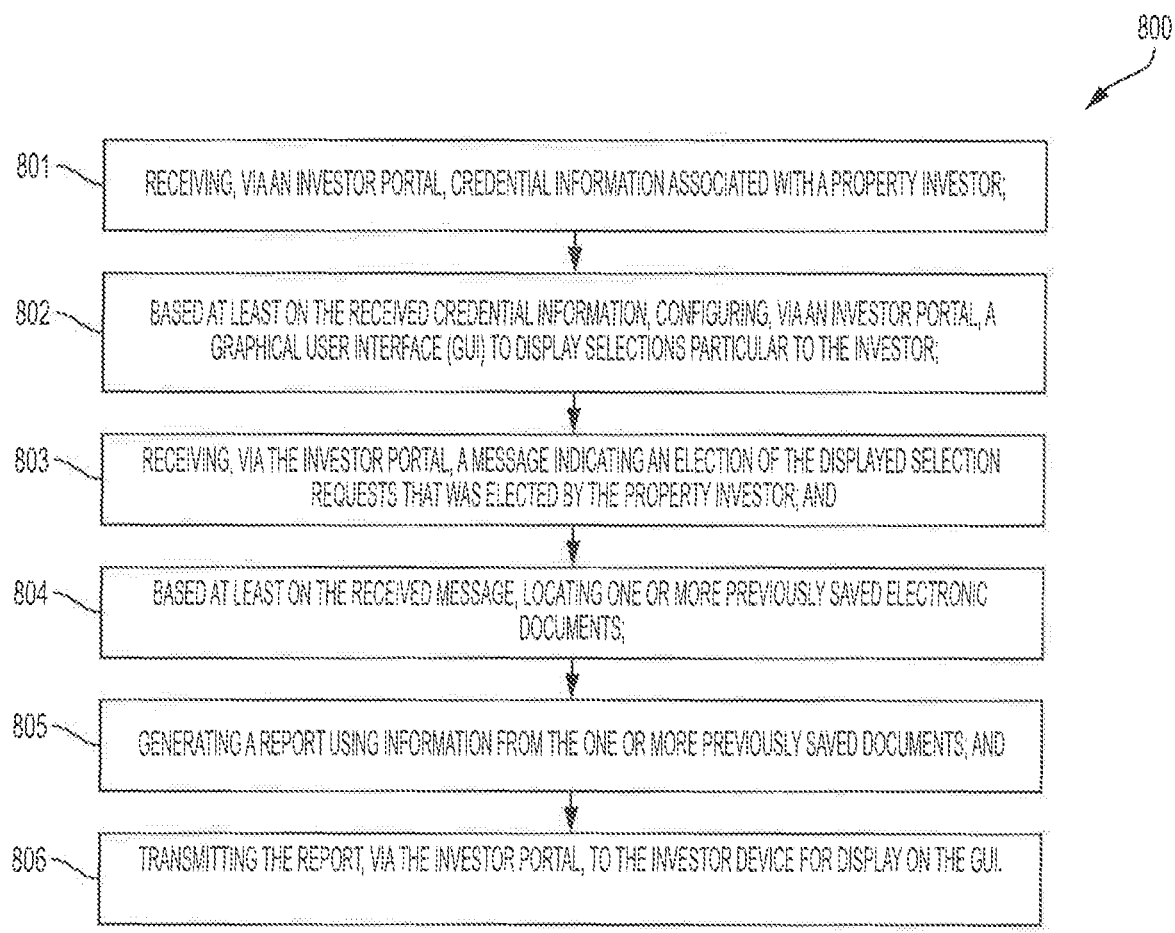
FIG. 8 illustrates aspects of steps performed by an property investor management system according to described embodiments.

FIG. 8 illustrates aspects of steps performed by an intelligent property management system and/or an investor system according to described embodiments. Specifically, method 800 comprises steps performed by at least one embodiment of an intelligent property management platform and/or investor system according, to inventive concepts described herein, such as intelligent property management platform 101 and/or investor system 700, aspects of which are illustrated at FIG. 1 and. FIG. 7, respectively.

At step 801, a property management platform receives, via an investor portal, credential information associated with a property investor.

At step 802, the property management platform, based at least on the received credential information, configures, via an investor portal, a graphical user interface (GUI) to display selections particular to the investor. Examples of selections displayed by the GUI, comprise but are not limited to, financial reports, smart contract reports, information about one or more investment properties, information about other investors, records of documents uploaded by the investor, information about vendors, information about tenants, information about security devices, information about communication service devices, information about taxes, information about shares, information about payments owed to the investment group, information about payments owed to the investor, information about payments owed to other investors, and/or the like. Parameters can be comprised in the selections, including but not limited to, time periods, geographic areas, property categorizations, vendor categorizations, and/or the like. Conditions can be comprised in the selections, for example, if a property is operating at x percent loss, then generate an expense report of the property. In embodiments, the GUI can comprise a signature option, where selection of the signature option adds a digital signature of the investor to a record. An investors' access to information from the property management platform can be restricted based at least on the privilege access assigned to the investors' credentials.

At step 803, the property management platform receives, via the investor portal, a message indicating an election of the displayed selection requests that was elected by the property investor.

At step 804, the property management platform, based at least on the received message, locates one or more previously saved electronic documents. The previously saved electronic documents can be one or more records previously stored by the property' management platform, including but not limited, to tenant and/or vendor requests discussed above, tenant and/or vendor confirmations discuses above, smart contracts, smart lease contracts, recommended service records, payment records, and/or the like, The previously saved electronic documents can be stored as part of a block chain and can be stored on a distributed ledger.

At step 805, the property management platform generates a report using information from the one or more previously saved documents. In embodiments, the generated report can be verified, and identified as verified, via hash codes of one or more of the previously saved documents used when generating the report.

At step 806, the property management platform transmits the report, via the investor portal, to the investor device for display on the GUI. Examples of reports comprise, but are not limited to, financial reports, financial reports of a particular property, financial reports associated with a particular employee of one or more property, tax reports profit/loss reports, and/or the like. At step 807, reports sent to the investor can be stored as one or more record. The one or more record can be stored according to a block chain and can be stored in a distributed ledger.

In embodiments, the GUI can provide a payment option where an investor can elect to receive a payment from the property investment group and/or transmit a payment to the property investment group. In embodiments, an investor can indicate credit card information and/or bank routing information to transmit a payment and/or receive a payment.

Figure 9:
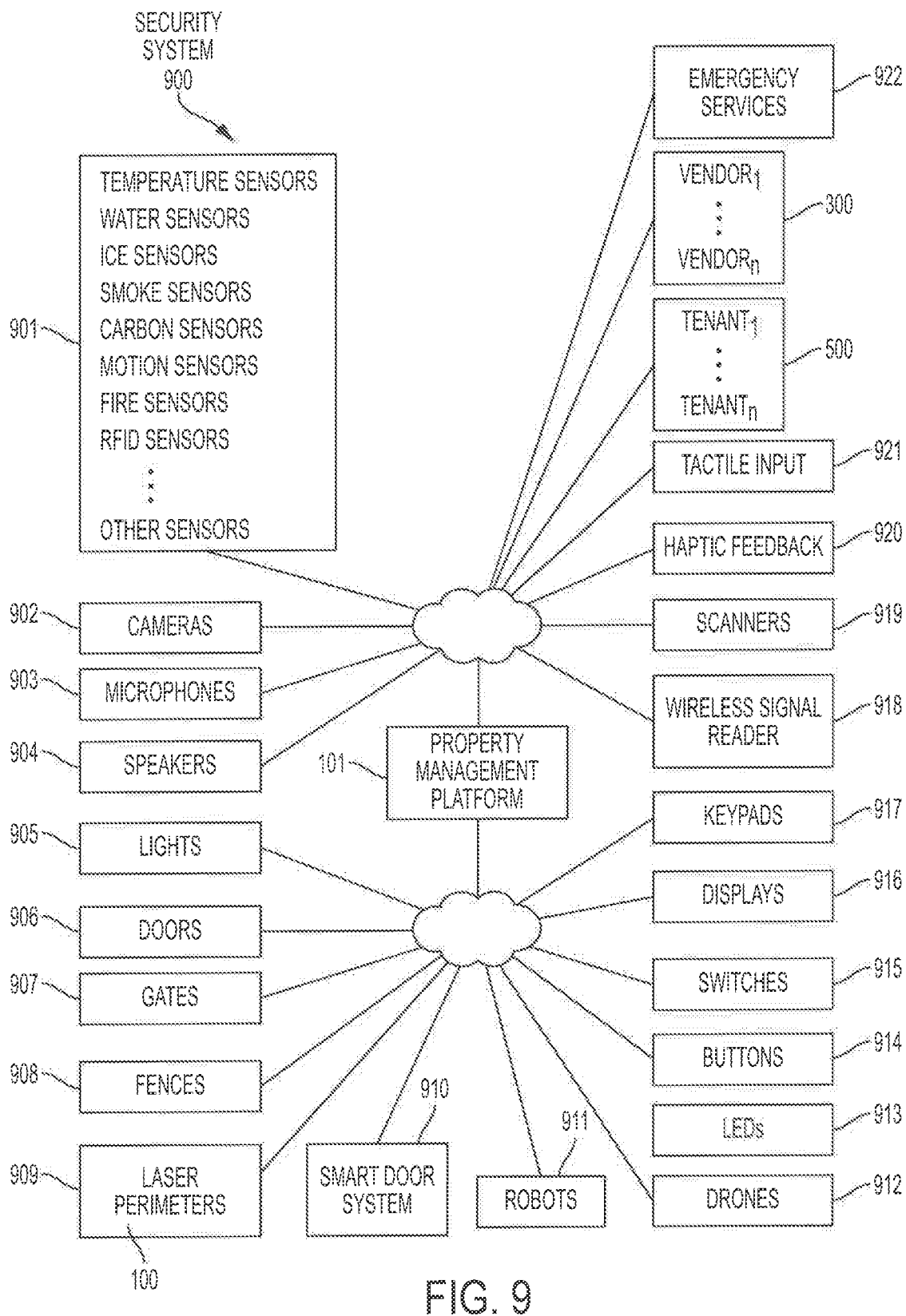
FIG. 9 illustrates aspects of a security device system according to described embodiments.

FIG. 9 illustrates certain aspects of security device system 900 according to described embodiments, security device system Security device system 900 communicates with property management platform 101, which can comprise the features described herein including a non-transitory memory communicatively coupled to one or more processors storing code that, when executed, enables security device system 900 to perform functions described herein. Security device system 900 can comprise a plurality of security devices distributed throughout various locations of one or more intelligently managed properties (e.g., an apartment complex or plurality of commercial buildings).

Security devices in security device system 900 comprise one or more sensors 901. Sensors 901 can detect force, load, tension, and compression forces. Other data comprises acceleration, velocity, global absolute displacement; local relative displacement, rotation, strain, stress, force, static-position video, and moving-position video. According to exemplary embodiments: (1) acceleration can be detected by Force-Balance (Servo) Piezoelectric Piezoresistive MEMS, (2) velocity can be measured by force-balance (servo) MEMS or Mechanical Doppler Heated wire, (3) a local Displacement sensor can be a LVDT/Cable potentiometer Acoustic Optical/laser Temperature Electrical Optical fiber, (4) a rotation sensor can be a Gyro MEMS Gyro Till Electro-mechanical MEMS, (5) a strain sensor can be a resistance gauge Vibrating wire Optical fiber Corrosion Electrical Chemical sensor, and (6) a crime sensor can be a microphone listening to acoustic emissions or Piezoelectric MEMS, where, e.g., sonar sound processing can be used to detect where certain activity originates. Accordingly, sensors 901 can comprise temperature sensors, water sensors, ice sensors, smoke sensors, carbon monoxide sensors, motion sensors, fire sensors, RFID sensors, and other sensors.

As further seen, security device system 900 also comprises cameras 902, microphones 903, speakers 904, lights, doors 906, gates 907, fences 908, laser perimeters 909, smart door systems 910 (e.g., the smart door system described commonly assigned U.S. patent application Ser. No. 15/881, 641 the disclosure of which is incorporated herein by reference), robots 911, drones 912, light emitting diodes (LEDs) 913, buttons 914, switches 915, displays 916, keypads 917, wireless signal readers 918, scanners 919, haptic feedback 920, tactile input 921, and/or the like. Some and/or all of the security devices can communicate wirelessly via Bluetooth, WiFi, and/or the like. Some and/or all of the security devices can be hardwired into a power supply and/or battery powered.

One or more of the security devices can transmit and receive information to and from property management platform 101 via security portal 900. One or more of the security devices can transmit and receive information to and from emergency services 922 via security portal 900. Example emergency services comprise, but arc not limited to, a fire department, emergency medical services, a police station, a security monitoring service, an emergency maintenance service, and/or the like. One or more of die security devices can transmit and receive information to and from each other via security portal 900. One or more of the security devices can transmit and receive information to and from one or more tenant device via tenant system 500, one or more vendor device via vendor system 300, and one or more investor device via an investor portal system 700.

According to an embodiment, system 900 can also comprise a gate or other actuating barrier that functions as a smart appliance. Accordingly, such a gate has the ability to control gate access in, e.g., a smart apartment community, where the smart gate is actuated in response any number of environmental conditions or triggers. Consistent with the foregoing concept, the smart gate could be controlled over a long-range wireless network (e.g., an LTE network) in place of a standard analog phone line. These functions could ultimately be managed by intelligent property management platform 101.

Figure 10:
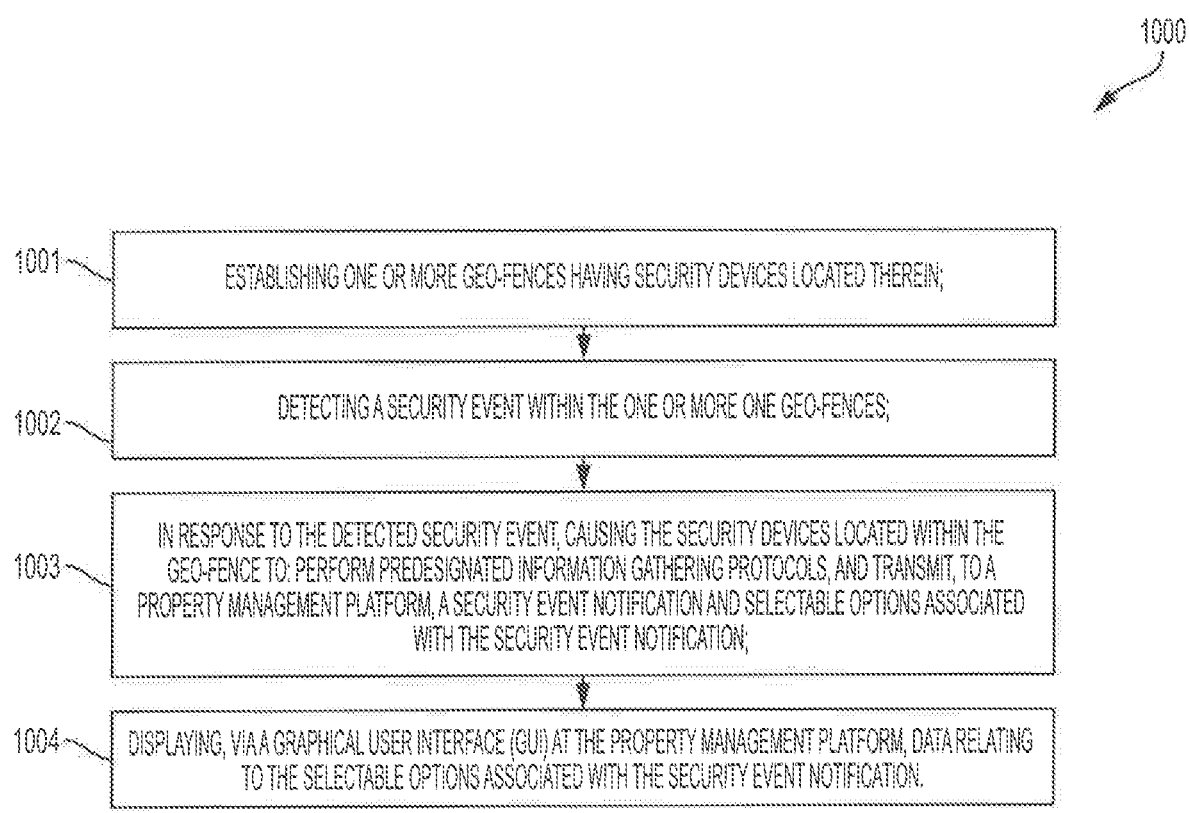
FIG. 10 illustrates aspects of steps performed by a security device system according to described embodiments.

FIG. 10 illustrates aspects of steps performed by an intelligent property management system and/or a security device system according to described embodiments. Specifically, method 1000 comprises steps performed by at least one embodiment of an intelligent property management platform and/or security device system according to inventive concepts described herein, such as intelligent property management platform 101 and/or security device system 900, aspects of which arc illustrated at FIG. 1 and FIG. 9, respectively.

At step 1001, establishing one or more geo-fences having security devices located therein is established.

At step 1002, a security event within the one or more one geo-fences is detected. Example security events comprise, but are not limited to, a fire, an intruder, a freeze, a flood, smoke, carbon monoxide, an unauthorized fire arm or other weapon, a physical attack, threat of a physical attach, detection of a person in violation of a protective order, failure of a security device, a medical emergency, detection of an animal not wearing a registered RFID collar, and/or the like. In embodiments, analysis of data collected from one or more of the security devices detects the security event. For example, facial recognition of an facial image from a camera in conjunction with information stored in the property management platform indicating a list of unauthorized persons can detect the security event. One or more image of a metallic device of a certain size in conjunction with alert data from a motion detector inside a premises in armed mode can detect an armed intruder. In another example, motion sensor data of a large body suddenly laying still in an unexpected location can indicate a medical emergency.

At step 1003, in response to the detected security event, the security devices located within the geo-fence perform predesignated information gathering protocols, and transmit, to a property management platform, a security event notification and selectable options associated with the security event notification. For instance, security devices located within the geo-fence perform predesignated information gathering protocols to facilitate communication among devices and gather environmental information in proximity to each security device. In embodiments, protocols performed by the security devices within the geo-fence can be conditioned on a type of security event detected. For example, protocols performed upon detection of a physical attack can be different from protocols performed upon detection of a kitchen flood. Further, the perimeter of the geo-fence can be dynamically based on information gathered from security devices within the geo-fence. Example protocols comprise, but are not limited to, storing records of image data and/or sound data (e.g., from cameras, microphones, robots, drones, etc.), data sensed by one or more sensor (e.g., air quality data), motion data (e.g., from doors, gates, fences, laser perimeters, etc.).

At step 1004, data relating to the selectable options associated with the security event notification is displayed, via a graphical user interface (GUI) at the property management platform. For instance, based on at least on the security event, the property management platform can transmit a security event notification to property management user device, via a security portal. A graphical user interface (GUI) at the property management user device can display the security event notification. In embodiments, the GUI can also provide selectable options associated with the security event. For example, selectable options comprise, but are not limited to, transmitting notices to one or more vendor via the vendor portal, transmitting notices to one or more tenant via the tenant portal, adjusting the perimeter of the geo-fence, controlling one or more security device of the property. Examples of controlling one or more security device of the property comprises, but is not limited to opening doors, gates, and/or fences, closing doors, gates, and/or fences, activating and/or deactivating speakers, lights, haptic feedback and other devices that alert occupants of the property, and/or actuating switches to turn services off and/or on (e.g., natural gas services, communication services, electricity services, and the like). At step 1004, the property management platform receives from the property management user device a message indicating one or more options selected by the property management.

In embodiments, one or more detected security events cause notifications to be sent to emergency services, vendors, and/or tenants regardless of a property management selecting a notification option. For example, a water sensor that detects a threshold amount of water can automatically notify a flood service. Further, a smoke detector that detects a threshold amount of smoke can automatically notify a fire department and tenants.

The method can further determine that the detected security event has concluded. In embodiments, a property management using a property management user device can select an option on the GUI indicating the security event has been contained and/or is a false event. In embodiments, analysis of information received from one or more security device can indicate that the detected security event has been contained and/or is a false event. For example, a carbon monoxide detector can determine that the air quality is safe. Further, a tenant and/or vendor using a tenant device and/or vendor device can communicate a notification through one of the various portals that the detected security event is contained or a false event. Upon the property management platform determining the detected security event has concluded, the geo-fence can be released, and analysis and/or conclusions regarding the detected security event can be recorded.

Also, one or more record associated with the security event including one or more of the notification of the security event, the geo-fence creation, information gathered from the security devices of the geo-fence, and the one or more options selected by the manager can be stored in association with each other as related to an identifiable detected security event. The records can be stored as one or more blocks in a block chain or other distributed ledger. The block chained records can be a part of a permanent, indisputable record used to analyze a cause of the event, a handling of the event, resolution of the event, to create vendor requests and tenant request, to generate insurance claims, to inform litigation, and/or the like.

Figure 11:
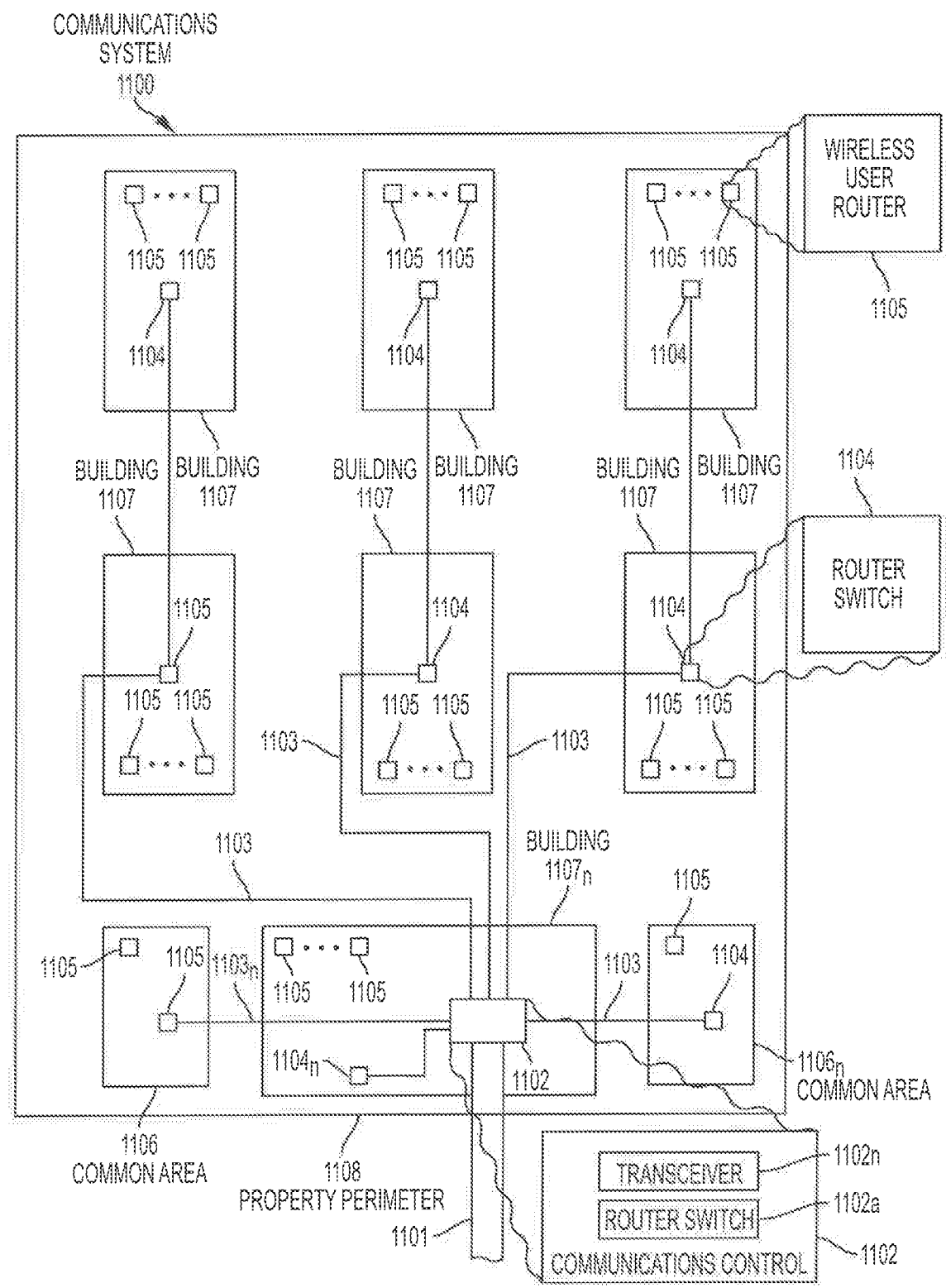
FIG. 11 illustrates aspects of a communication portal system according to described embodiments.

FIG. 11 illustrates certain aspects of communication services system 1100 according to described embodiments. The communication portal system 1100 communicates with property management platform 101, which comprises features described herein causing code, that when executed, enables the communication portal system 1100 to perform functions described herein. Communication portal system 1100 can comprise a plurality of communication devices distributed throughout various locations of a property (e.g., apartment complex).

For example, last mile 1101 (e.g., copper wire, coaxial cables, fiber optics, fixed wireless access, and/or die like) can be piped into the property perimeter 1108 and connect to a communications control 1102, which controls data moving into and out of the campus perimeter via the communications service system 1100. Communications control 1102 can comprise one or more processor 1102a, one or more transceiver 1102b, one or more router switch 1102c, and one or more memories including a non-transitory memory communicatively coupled to at least one of the one or more processor storing code that, when executed, enables the communication portal system 1100 to perform functions described herein. Communication portal system 1100 can comprise one or more communication portal system user device 1102n (e.g., smart phone, tablet, laptop, desktop, and/or the like).

Communications control 1102 can communicate with router switches 1104 distributively located throughout the property perimeter 1108. Communications control 1102 can couple to router switches 1104 via a wired connection (e.g., fiber optics) and/or wirelessly. In embodiments, router switch 1104 can couple to wireless user routers 1105, which are distributively located around router switches 1104. A given wireless user router 1105 can couple to router switch 1104 via a wired connection (e.g., fiber optics) and/or wirelessly. In embodiments, wireless user router 1105 can provide secured wireless communications (e.g., WiFi) to tenant devices. For example, each tenant premises within an example building can comprise a wireless router 1105 that provides secured wireless communications, via user credentials, to users and devices within wireless range having the user credentials.

Figure 12:
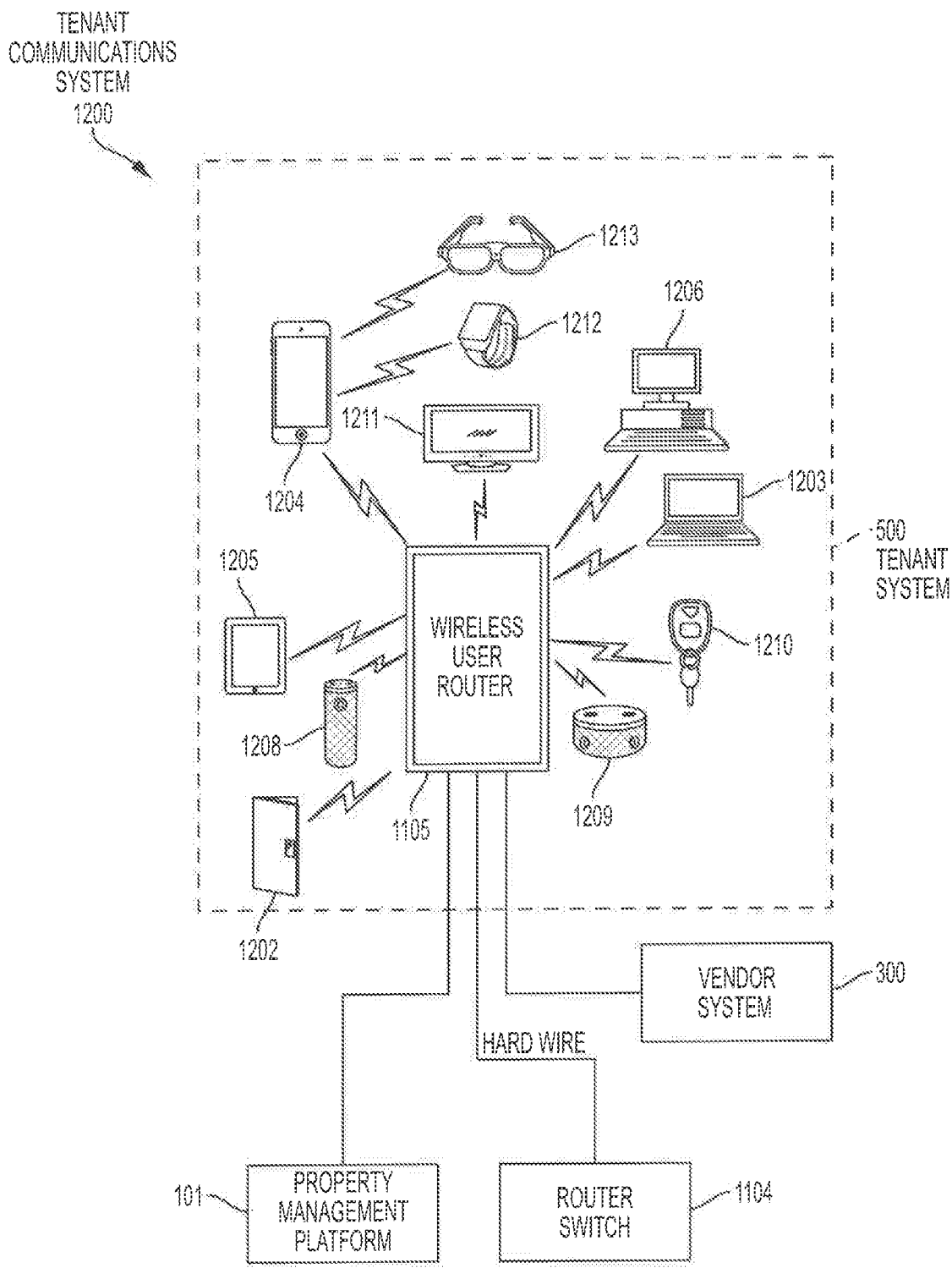
FIG. 12 illustrates additional aspects of steps performed by a communication portal system according to described embodiments.

FIG. 12 illustrates an example tenant premises 1200 of communication portal system 1100. In embodiments, wireless user router 1105 can provide wireless communications to devices within communication range of the router. Example communication devices comprise, but are not limited to, laptop 1203, smart phone 1204, tablet 1205, desktop 1206, smart speaker 1208, smart mini-speaker 1209, key fob 1210, smart TV 1211, smart watch 1212, smart glasses 1213, and/or the like. Other devices powered by wireless user router 1105 comprise any and/or all security devices discussed in FIG. 9. Wireless user router 1105 can be coupled to smart door system 1202 and can be powered thereby. Some and/or all of the communication devices can communicate with wireless user router 1105 wirelessly via Bluetooth, WiFi, and/or the like. Some and/or all of the communication devices can be hardwired into a power supply and/or battery powered. In embodiments, using tenant credentials a tenant device (e.g., of FIG. 5) can communicate with the property management portal system 100 via the communications service system 1100 and via the tenant system 500. Further, using vendor credentials, a vendor device (e.g., of FIG. 3) can communicate with the property management portal system 100 via the communications service system 1100 and via the vendor system 300. Various devices can communication with the portal systems through the communication portal system 1100 according to user credentials and privileges associated therewith.

Figure 13:
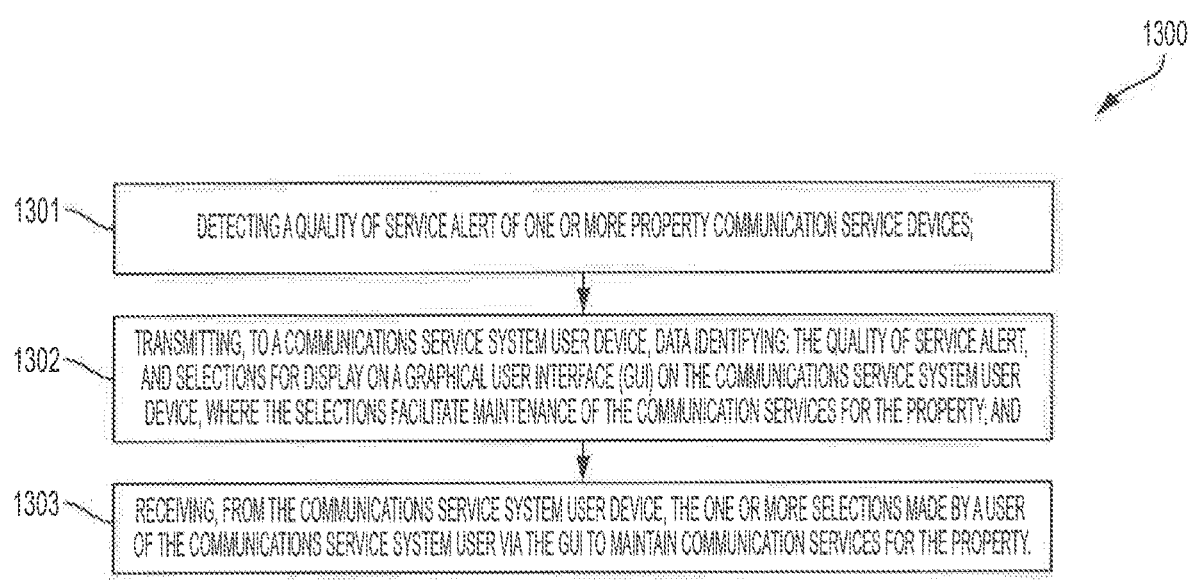
FIG. 13 illustrates aspects of steps performed by a communication portal system according to described embodiments.

FIG. 13 illustrates aspects of steps performed by an intelligent property management system and/or a communication services system according to described embodiments. Specifically, method 1300 comprises steps performed by at least one embodiment of an intelligent property management platform and/or communication services system according to inventive concepts described herein, such as intelligent property management platform 101 and/or communication services system 1100, aspects of which are illustrated at FIG. 1, FIG. 11, and FIG. 12, respectively.

At step 1301, a quality of service alert of one or more property communication services devices is detected, in doing so, the communications service system detects a quality of service alert of one or more property communication service devices. The quality of service alert can be transmitted by a user device (e.g., by a tenant via a tenant device, a property manager via a property management platform, a vendor via a vendor device). Further, a smart appliance can detect a quality of service malfunction and self-generate and transmit a quality of service alert.

At step 1302, data identifying (1) the quality of service alert, and (2) selections for display on a. graphical user interface (GUI) on the communications service system user device, are transmitted to a communications service system user device. The selections facilitate maintenance of the communication services for the property. According to an embodiment, this involves transmitting a message identifying the quality of service alert from the communications service system to a communications service system device user.

At step 1303, one or more selections made by a user of the communications service system user device is received. This information can be displayed via the GUI to maintain communication services for the property. In response to the selections, the communications service system performs one or more tasks. Examples of selections comprise testing options, which perform quality of service tests for diagnostic purposes. Other examples comprise dismissal options, monitoring options, and/or the like. Further, selections can generate an indicator recommending a service be performed, which when selected cause other methods or routines to initiate. When the one or more selections generate an indicator recommending that a service be performed, the selections can comprise a record that becomes part of the smart contract. Further, records including the quality service alert, an identity of the user, and the received one or more elected options, and other performed tasks are generated and/or stored. The records can be stored as one or more blocks in a block chain or other distributed ledger.

As discussed, described embodiments create records in a block chain. A block chain is a data structure that stores and transmits data in units called a block. The blocks of a block chain are built over time by one or more processor, saved in chronological order in one or more memories, and each block comprises the digital signature of its immediately preceding block. By maintaining chronologic order and including the digital signature of a block's immediately preceding block, records of the blocks become immutable.

Figure 14:
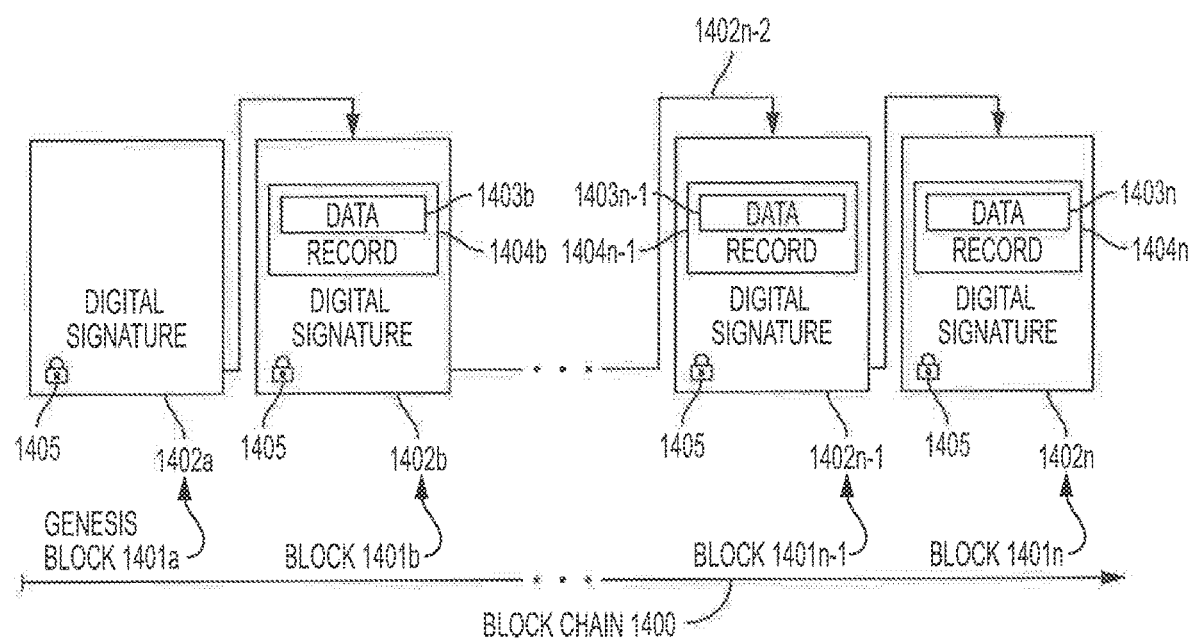
FIG. 14 illustrates certain aspects of block chain 1400 according to described embodiments

FIG. 14 illustrates certain aspects of block chain 1400 according to described embodiments, which can be utilized to implement, e.g., authentication features and other decentralized or distributed ledger features described herein. Blockchain 1400 comprises genesis block $1401_a$, second block $1401_b$, n–1 block $1401_{n-1}$, and $n_{th}$ block $1401_n$. Genesis block $1401_a$ comprises at least a digital signature $1402_a$ and is stored in one or more memories.

Second block $1401_b$ is generated next in time after genesis block $1401_a$. Second block $1401_b$ is generated by a processor that received data $1403_b$ for inclusion into record $1404_b$. Upon receiving data $1403_b$, the processor creates record $1404_b$, which comprises data $1403_b$ (and/or information derived therefrom) and can also comprise additional information (e.g., time stamps, date stamps, user credential information, data origination information, and/or the like). The processor also generates digital signature $1402_b$ of second block $1401_b$. The processor can generate digital signature $1402_b$ via a cryptographic algorithm 1405 executed for each respective block. Input into cryptographic algorithm 1405 is digital signature $1402_a$ of genesis block $1401_a$ and some or all information of record $1404_b$. In some embodiments, additional information is input to cryptographic algorithm 1405, for example, time stamps, date stamps, user credential information, data origination information, and/or the like. Output from cryptographic algorithm 1405 is the digital signature $1402_b$ of second block $1401_b$. Second block $1401_b$ is stored in one or more memories and comprises at least record $1404_b$ and digital signature $1402_b$.

$N_{th}$ block $1401_n$ is generated next in time after n–1 block $1401_{n-1}$. $N_{th}$ block $1401_n$ is generated by a processor that received data $1403_n$ for inclusion into a record $1404_n$. The processor that generates nth block $1401_n$ can be the same or different processor that generated n–1 block $1401_{n-1}$ and/or second block $1401_b$. Upon receiving data $1403_n$, the processor operates as described above to generate nth block $1401_n$ using one or more cryptographic algorithms 1405 of block chain 1400. $N_{th}$ block $1404_n$ is stored in one or more memories and comprises at least digital signature $1402_n$, data $1403_n$ and record $1404_n$.

Each block in block chain 1400 can be stored centrally in one or more memories and/or distributed in a plurality of memories. Further, blocks of block chain 1400 can be centrally generated by one or more processors and/or by distributed processors.

Figure 15:
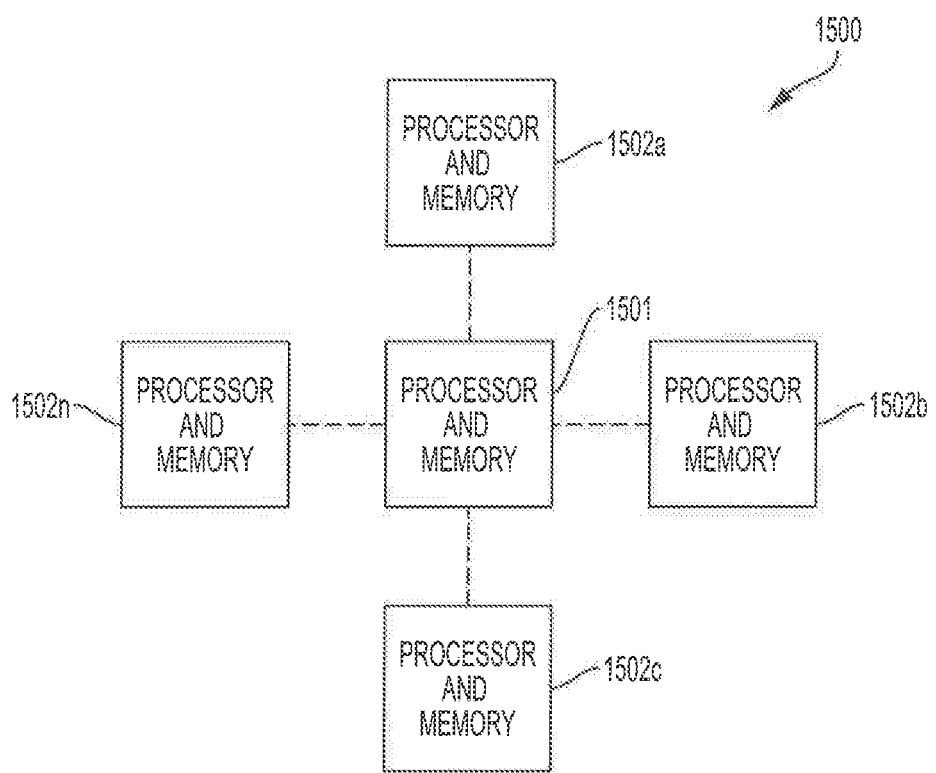
FIG. 15 illustrates aspects of a decentralized block chain generation and/or storage system according to described embodiments.

FIG. 15 illustrates aspects of centralized block chain generation and/or storage system 1500 according to described embodiments. System 1500 comprises centralized node 1501, which comprises one or more processors and one or more memories. System 1500 also comprises a plurality of remote nodes $1502_a$-$1502_n$, each of which also comprise one or more processors and one or more memories. In embodiments, any of remote nodes $1502_a$-$1502_n$ can generate a block of a block chain and transmit it to centralized node 1501 for storage within the block chain. Further, of remote nodes $1502_a$-$1502_n$ can transmit data to centralized node 1501, where centralized node 1501 generates the block and stores it within the block chain.

Figure 16:
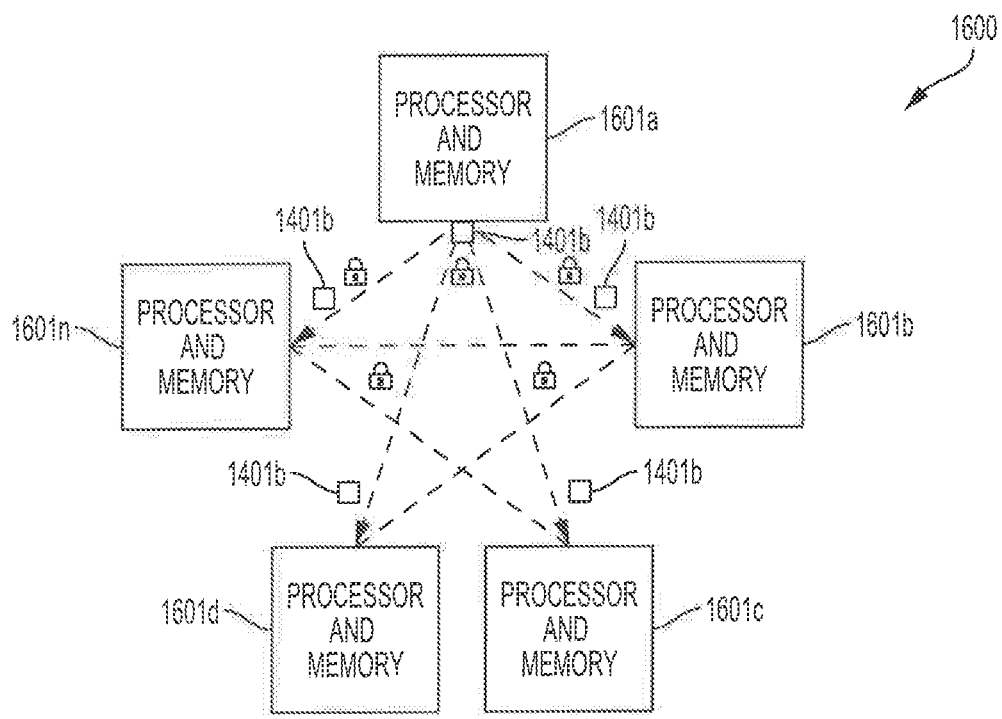
FIG. 16 illustrates aspects of a distributed block chain generation and or storage system according to described embodiments.

FIG. 16 illustrates aspects of distributed block chain generation and/or storage system 1600 according to described embodiments. Distributed ledger 1600 comprises a plurality of remote nodes $1601_a$-$1601_n$, each of which comprise one or more processors and one or more memories. In embodiments, any of remote nodes $1601a$-$1601_n$ can generate a block of a block chain, e.g., blockchain 1400 (of FIG. 14) and then distribute the block to each of the other nodes for storage on a replicated ledger.

In this example, node $1601_a$ generates block $1401_a$ and adds it to block chain 1400 stored within a ledger of the memory of node $1601_a$. Node $1601_a$ also distributes block $1401_a$ to each of the other nodes comprising the distributed ledger. For example, node $1601_a$ transmits block $1401_a$ to node $1601_b$. Upon receiving block $1404_a$, node $1601_b$ validates the authenticity of block $1401_b$ to determine whether the block should be added to the ledger of node $1601_b$. In one instance, node $1601_b$ is configured to know the input and the cryptographic algorithm that other nodes of the distributed ledger would have used to generate the received block. With this knowledge, node $1601_b$ tests the authenticity of the received block. If the block is verified as authentic, then block $1401_a$ is added to block chain 1400 within a ledger of the memory of receiving node $1601_b$. Each of nodes $1601_b$-$1601_n$ perform the validation process and add the block to their block chain if authenticity is verified. Because each of the nodes add each authenticated received block to the ledger of their block chain, each node comprising the distributed ledger have replicated ledgers. Therefore, all of the ledgers comprising the distributed ledger comprise the same information at all times, which provides redundancy and multiple points of access. Further, if authentically of a block is not verified, then the nodes do not add the unverified block to their respective block chain, which prevents malicious blocks and/or fake blocks from being added to one or more of the nodes' block chains, thereby ensuring accuracy and security.

Although the present invention and its advantages have been described in detail, it should be understood that various changes, substitutions and alterations can be made herein without departing from the spirit and scope of the invention as defined by the appended claims. For example, one or more steps of methods disclosed herein can be omitted, rearranged, and or added to, as is desired. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein can be utilized according to the present invention. Accordingly, the appended claims are intended to comprise within their scope such processes, machines, manufacture, compositions of matter, means, methods, or steps.

The invention claimed is:

1. An intelligent property management system, the intelligent property management system comprising:
a property management platform comprising: a vendor portal, a tenant portal, a security portal, and a communication services portal;
one or more processors;
a non-transitory memory communicatively coupled to at least one of the one or more processors;
where the one or more processors are configured to wirelessly communicate data structures between:
the property management platform and one or more vendors via the vendor portal,
the property management platform and one or more tenants via the tenant portal,
the property management platform and one or more property security devices via the security portal, and
the property management platform and one or more communication service devices via the communication services portal; and
where the one or more processors are further configured to:
manage tenant credentials providing tiered tenant privileges with respect to tenants of a property, and where the tiered tenant privileges include first tier privileges and second tier privileges that correspond to a lower tier than the first tier privileges, the second tier privileges providing reduced access functionality compared to the first tier privileges;
receive, via the tenant portal, a tenant request for performance of a service, wherein a tenant making the tenant request for performance of the service is included in a vendor selection process based upon the tiered tenant privileges, wherein the vendor selection process provides tiered vendor selection privileges to the tenant with respect to the tenant request for performance of the service based upon a determination that the tenant has the first tier privileges or that the tenant has the second tier privileges;
store the tenant request for performance of the service as one or more records in a blockchain;
schedule a first vendor to perform a first service call of the service according to the vendor selection process;
transmit, via the vendor portal, an instruction to the first vendor to perform one or more tasks of the first service call;
establish a geo-fence at a location that includes at least some of the one or more property security devices, where the data structures wirelessly communicated via the security portal indicate detection of a security event within the geo-fence by the one or more property security devices, and where the security event corresponds to detection of a person within the geo-fence;
dynamically adjust a perimeter of the geo-fence based on the detection of the security event and the data structures wirelessly communicated via the security portal;
store an indication of activation of the geo-fence, the perimeter of the geo-fence, and an adjustment to the perimeter of the geo-fence as a record in the blockchain;
determine a conclusion of the security event or a handling of the security event based on at least one record in the blockchain, where the handling of the security event comprises:
perform facial recognition on an image of the person included in the data structures wirelessly communicated via the security portal and information indicating one or more authorized persons; and
open a door, a gate, or a fence of the one or more property security devices based on the person being included in the one or more authorized persons;
receive, via the vendor portal, a first vendor completion notification from the first vendor that the first service call has been performed with respect to the service;
store the first vendor completion notification as one or more records in the blockchain;
transmit, via the tenant portal, a first confirmation request to the tenant requesting confirmation that the first vendor performed the one or more tasks of the first service call to satisfaction of the tenant;
receive, via the tenant portal, a first confirmation from the tenant that the one or more tasks of the first service call have been performed to the satisfaction of the tenant; and
store the first confirmation from the tenant in the blockchain in association with the tenant request for performance of the service to indicate performance with respect to the service.

2. The intelligent property management system of claim 1 where the tenant request for performance of the service comprises at least one of: a request for maintenance service; a request that a supply be shipped; and a request regarding timing of the performance.

3. The intelligent property management system of claim 1 where the first tier privileges comprise full vendor selection privileges, and where the second tier privileges comprise partial vendor selection privileges that enable selection of vendors that enter the property and that do not enable selection of vendors that do not enter the property.

4. The intelligent property management system of claim 1 where image data collected by the one or more property security devices is stored as one or more records in the blockchain.

5. The intelligent property management system of claim 1 where geo-fence data relating to the security event within the geo-fence is communicated in the data structures wirelessly communicated via the security portal.

6. The intelligent property management system of claim 1 where one or more data structures received via a respective portal are stored as one or more blocks in the blockchain.

7. The intelligent property management system of claim 1 where receiving the tenant request for performance of the service and receiving the first vendor completion notification comprise terms of a smart contract associated with the blockchain, and where the terms of the smart contract further comprise automatically transferring compensation to a vendor based on the performance of the service by the vendor.

8. The intelligent property management system of claim 1 where the one or more processors are further configured to manage vendor credentials providing one or more tiered vendor privileges.

9. The intelligent property management system of claim 1 where the one or more processors are further configured to:
wirelessly communicate additional data structures between the property management platform and one or more investors via an investment portal of the property management platform, where the additional data structures comprise at least one of: a request for credential information associated with one or more investors, financial information associated with the property, and value information relating to a property investment; and
manage investor credentials providing one or more tiered investor privileges, where the one or more tiered investor privileges include different information access privileges for different investors.

10. The intelligent property management system of claim 1 where the one or more processors are further configured to initiate transmission of a notice to a particular device selected from a group of devices based on the detection of the security event and the data structures wirelessly communicated via the security portal, the group of devices comprising a vendor device, a tenant device, and an emergency service device.

11. The intelligent property management system of claim 1 where the one or more processors are further configured to:
determine the conclusion of the security event based on additional data structures wirelessly communicated by via the security portal from the one or more property security devices; and
release the geo-fence responsive to the conclusion of the security event.

12. The intelligent property management system of claim 1 where the one or more processors are further configured to:
display, at the property management platform and based on the data structures wirelessly communicated via the security portal, a security event notification and multiple selectable options corresponding to the security event notification, the multiple selectable options comprising an option to transmit a notice to one or more vendors via the vendor portal and an option to transmit a notice to one or more tenants via the tenant portal; and
perform a selected operation based on selection of at least one option of the multiple selectable options.

13. The intelligent property management system of claim 1 where the tenant request for performance of the service comprises a request for performance of multiple services by multiple vendors, and where the one or more processors are further configured to:
determine a sequence for performance of the multiple services by the multiple vendors.

14. The intelligent property management system of claim 12 where the one or more processors are further configured to store the security event notification, the multiple selectable options, and the selected operation as a record in the blockchain to indicate the detection of the security event.

15. The intelligent property management system of claim 1 where the data structures wirelessly communicated via the security portal include image data collected by the one or more property security devices and motion data collected by the one or more property security devices, and where the one or more processors are further configured to detect the security event based on detection of a particularly-sized object within the image data and detection of motion based on the motion data.

16. The intelligent property management system of claim 1 where the first vendor is scheduled to perform the first service call of the service based on information of one or more supplies associated with the first service call.

17. The intelligent property management system of claim 1 where the one or more processors are further configured to hold payment to the first vendor for the first service call until receipt of the first confirmation from the tenant that the one or more tasks of the first service call have been performed to the satisfaction of the tenant.

18. The intelligent property management system of claim 1 where the one or more processors are further configured to, based on receiving the tenant request for performance of the service:
determine a sequence for performance of the service by a plurality of vendors, wherein the plurality of vendors includes the first vendor and a second vendor; and
schedule the second vendor to perform a second service call of the service.

19. The intelligent property management system of claim 18 where the one or more processors are further configured to, based on receiving the first vendor completion notification from the first vendor that the first service call has been performed with respect to the service:
transmit, via the vendor portal, an instruction to the second vendor to perform one or more tasks of the second service call;
receive, via the vendor portal, a second vendor completion notification from the second vendor that the second service call has been performed with respect to the service;
store the second vendor completion notification as one or more records in the blockchain to indicate performance with respect to the service;
transmit, via the tenant portal, a second confirmation request to the tenant requesting confirmation that the second vendor performed the one or more tasks of the second service call to satisfaction of the tenant;
receive, via the tenant portal, a second confirmation from the tenant that the one or more tasks of the second service call have been performed to the satisfaction of the tenant; and
store the second confirmation from the tenant in the blockchain in association with the tenant request for performance of the service to indicate performance with respect to the service.

20. The intelligent property management system of claim 19 where the one or more processors are further configured to hold payment to the second vendor for the second service call until receipt of the second confirmation from the tenant that the one or more tasks of the second service call have been performed to the satisfaction of the tenant.

21. The intelligent property management system of claim 18, where scheduling the first vendor and scheduling the second vendor is based on timing of the first and second service calls and schedules of the first and second vendors.

* * * * *

UNITED STATES PATENT AND TRADEMARK OFFICE
CERTIFICATE OF CORRECTION

| | |
|---|---|
| PATENT NO. | : 11,694,287 B2 |
| APPLICATION NO. | : 15/984249 |
| DATED | : July 4, 2023 |
| INVENTOR(S) | : Dave Marcinkowski et al. |

It is certified that error appears in the above-identified patent and that said Letters Patent is hereby corrected as shown below:

In the Specification

At Column 2, Line number 58, delete "and or" and replace with --and/or--.
At Column 3, Line number 61, delete "data Wireless" and replace with --data. Wireless--.
At Column 4, Line number 20, delete "herein For" and replace with --herein. For--.
At Column 4, Line number 49, delete "herein For" and replace with --herein. For--.
At Column 4, starting at Line number 58, delete "utilizing security portal 109" and replace with --utilizing security device portal 109--.
At Column 5, Line number 32, delete "communication" and replace with --communications--.
At Column 5, Line number 44, delete "recorded. on a" and replace with --recorded on a--.
At Column 5, starting at Line number 56, delete "utilizing to IoT" and replace with --utilizing IoT--.
At Column 7, starting at Line number 17, delete "wireless data The" and replace with --wireless data. The--.
At Column 7, Line number 38, delete "data The" and replace with --data. The--.
At Column 7, Line number 66, delete "receive. Investor" and replace with --receives investor--.
At Column 8, Line number 12, delete "one of;" and replace with --one of:--.
At Column 9, Line number 25, delete "Internet" and replace with --internet--.
At Column 9, Line number 42, delete "controlled. access" and replace with --controlled access--.
At Column 9, Line number 44, delete "herein The" and replace with --herein. The--.
At Column 10, Line number 15, delete "Which make no" and replace with --which make up--.
At Column 11, Line number 30, delete "an number" and replace with --any number--.
At Column 11, Line number 34, delete "vendors" and replace with --vendor$_1$--.
At Column 11, Line number 37, delete "call" and replace with --call$_1$--.
At Column 12, Line number 36, delete "sequence, be" and replace with --sequence, the--.
At Column 13, Line number 7, delete "record's" and replace with --records--.
At Column 13, Line number 21, delete "sequence the service" and replace with --sequence until the service--.
At Column 13, Line number 47, delete "completion, of" and replace with --completion of--.
At Column 14, starting at Line number 60, delete "tenant device, in doing so" and replace with --tenant device. In doing so--.

Signed and Sealed this
Twenty-sixth Day of September, 2023

Katherine Kelly Vidal
*Director of the United States Patent and Trademark Office*

CERTIFICATE OF CORRECTION (continued)
U.S. Pat. No. 11,694,287 B2

At Column 15, Line number 27, delete "hut" and replace with --but--.
At Column 16, Line number 6, delete "o the services" and replace with --of the services--.
At Column 16, Line number 43, delete "small" and replace with --smart--.
At Column 16, Line number 52, delete "cost)" and replace with --cost--.
At Column 17, Line number 40, delete "according, to" and replace with --according to--.
At Column 18, Line number 14, delete "property' management" and replace with --property management--.
At Column 18, Line number 18, delete "like, The" and replace with --like. The--.
At Column 18, Line number 32, delete "tax reports profit/loss" and replace with --tax reports, profit/loss--.
At Column 18, Line number 67, delete "Till" and replace with --Tilt--.
At Column 19, Line number 30, delete "arc" and replace with --are--.
At Column 19, Line number 33, delete "die" and replace with --the--.
At Column 19, Line number 59, delete "arc" and replace with --are--.
At Column 20, Line number 53, delete "not limited to opening doors" and replace with --not limited to, opening doors--.
At Column 21, Line number 45, delete "die" and replace with --the--.
At Column 22, Line number 47, delete "detected, in" and replace with --detected. In--.
At Column 22, Line number 57, delete "display on a. graphical" and replace with --display on a graphical--.
At Column 23, Line number 65, delete "$1404_n$" and replace with --$1401_n$--.
At Column 24, Line number 15, delete "Further, of" and replace with --Further, any of--.
At Column 24, Line number 33, delete "$1404_a$" and replace with --$1401_a$--.